(12) United States Patent
Meister et al.

(10) Patent No.: US 10,286,347 B2
(45) Date of Patent: May 14, 2019

(54) OIL SEPARATOR INCLUDING SPIRAL MEMBERS DEFINING HELICAL FLOW PATHS

(71) Applicant: Miniature Precision Components, Inc., Walworth, WI (US)

(72) Inventors: Brandon Meister, Eagle, WI (US); Christopher Jared Moncur, Loves Park, IL (US); Ryan Tanner, Elkhorn, WI (US); Brad Hakes, Janesville, WI (US); Oscar Davidson, Walworth, WI (US); Jon Bunne, Elkhorn, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 0 days.

(21) Appl. No.: 15/848,102

(22) Filed: Dec. 20, 2017

(65) Prior Publication Data
US 2018/0111073 A1    Apr. 26, 2018

Related U.S. Application Data

(63) Continuation-in-part of application No. 15/264,899, filed on Sep. 14, 2016.
(Continued)

(51) Int. Cl.
*B01D 45/08*    (2006.01)
*B01D 46/00*    (2006.01)
(Continued)

(52) U.S. Cl.
CPC ............. *B01D 45/08* (2013.01); *B01D 45/12* (2013.01); *B01D 45/16* (2013.01);
(Continued)

(58) Field of Classification Search
CPC ............... B01D 45/08; B01D 46/0036; B01D 46/0031; B01D 50/002; B01D 2279/60;
(Continued)

(56) References Cited

U.S. PATENT DOCUMENTS

| | | | | |
|---|---|---|---|---|
| 2,193,209 A | * | 3/1940 | Sandberg | B01D 45/16 55/355 |
| 2,271,642 A | * | 2/1942 | Holzwarth | B01D 45/16 261/DIG. 54 |

(Continued)

FOREIGN PATENT DOCUMENTS

DE    20302824 U1    7/2004

*Primary Examiner* — Dung H Bui
(74) *Attorney, Agent, or Firm* — Dickinson Wright PLLC

(57) ABSTRACT

An oil separator for separating oil from oil-laden gases includes a housing having a plurality of cavities with an auger disposed in each cavity. Each auger has a helical flight extending about a longitudinal central axis between inlet and outlet ends. At least one of the augers has an annular wall extending from the inlet end with an end cap, including an inlet, extending thereover to delimit an inlet chamber. A valve head is disposed in the inlet chamber, wherein a spring member biases the valve head to perfect a seal over the inlet to inhibit the flow of oil-laden gases therethrough. The valve head is moveable against the bias of the spring member to an open position in response to pressure applied against the valve head sufficient to overcome the spring member bias to promote the flow of oil-laden gases through the inlet chamber and about the auger.

18 Claims, 19 Drawing Sheets

Related U.S. Application Data

(60) Provisional application No. 62/218,608, filed on Sep. 15, 2015.

(51) Int. Cl.
  *F01M 13/04* (2006.01)
  *B01D 50/00* (2006.01)
  *B01D 45/12* (2006.01)
  *B01D 45/16* (2006.01)
  *F01M 13/00* (2006.01)
  *F02M 25/06* (2016.01)

(52) U.S. Cl.
  CPC ..... *B01D 46/0031* (2013.01); *B01D 46/0036* (2013.01); *B01D 50/002* (2013.01); *F01M 13/04* (2013.01); *B01D 2279/60* (2013.01); *F01M 2013/0072* (2013.01); *F01M 2013/0422* (2013.01); *F01M 2013/0427* (2013.01); *F01M 2013/0433* (2013.01); *F02M 25/06* (2013.01)

(58) Field of Classification Search
  CPC ........ B01D 45/16; B01D 45/12; F01M 13/04; F01M 2013/0433; F01M 2013/0427; F01M 2013/0072; F01M 2013/0422; F02M 25/06
  See application file for complete search history.

(56) References Cited

U.S. PATENT DOCUMENTS

| | | | |
|---|---|---|---|
| 2,538,195 A * | 1/1951 | Henkel | B01D 45/08 55/450 |
| 3,386,588 A * | 6/1968 | Ades | B04C 5/28 209/728 |
| 3,398,513 A * | 8/1968 | Thompson | B01D 47/02 55/449 |
| 4,666,476 A | 5/1987 | Reeve et al. | |
| 4,723,529 A | 2/1988 | Yokoi et al. | |
| 5,024,203 A | 6/1991 | Hill | |
| 5,113,671 A | 5/1992 | Westermeyer | |
| 5,129,371 A | 7/1992 | Rosalik, Jr. | |
| 5,269,949 A * | 12/1993 | Tuszko | B01D 45/12 209/716 |
| 5,323,740 A | 6/1994 | Daily et al. | |
| 5,404,730 A | 4/1995 | Westermeyer | |
| 5,450,835 A | 9/1995 | Wagner | |
| 5,579,744 A | 12/1996 | Trefz | |
| 5,617,834 A | 4/1997 | Lohr | |
| 6,279,556 B1 | 8/2001 | Busen et al. | |
| 6,293,268 B1 | 9/2001 | Mammarella | |
| 6,626,163 B1 | 9/2003 | Busen et al. | |
| 6,860,915 B2 | 3/2005 | Stegmaier et al. | |
| 7,007,682 B2 | 3/2006 | Takahashi et al. | |
| 7,140,358 B1 | 11/2006 | Shieh | |
| 7,246,612 B2 | 7/2007 | Shieh et al. | |
| 7,422,612 B2 | 9/2008 | Pietschner | |
| 7,604,676 B2 | 10/2009 | Braziunas | |
| 7,637,978 B2 * | 12/2009 | Jung | F02M 35/022 55/396 |
| 7,743,742 B2 | 6/2010 | Wagner et al. | |
| 7,896,946 B1 * | 3/2011 | Steffen | B01D 45/08 55/420 |
| 7,992,551 B2 | 8/2011 | Shieh | |
| 8,047,186 B2 | 11/2011 | Shieh et al. | |
| 8,555,827 B2 | 10/2013 | Schleiden | |
| 8,714,132 B2 | 5/2014 | Baumann et al. | |
| 9,074,558 B2 | 7/2015 | Roelver | |
| 2007/0256566 A1 * | 11/2007 | Faber | B01D 45/08 96/417 |
| 2007/0281205 A1 * | 12/2007 | Wagner | B01D 45/16 429/49 |
| 2008/0105494 A1 * | 5/2008 | Lemke | F01M 13/0011 184/6.23 |
| 2008/0155949 A1 * | 7/2008 | Dunsch | B01D 45/08 55/456 |
| 2009/0199826 A1 * | 8/2009 | Meinig | B01D 45/08 123/573 |
| 2010/0126479 A1 | 5/2010 | Shieh et al. | |
| 2010/0180854 A1 | 7/2010 | Baumann et al. | |
| 2011/0146639 A1 | 6/2011 | Martinengo et al. | |
| 2012/0168361 A1 * | 7/2012 | Motakef | B01D 46/0046 210/137 |
| 2012/0233973 A1 * | 9/2012 | Sedillo | B01D 45/16 55/342.2 |
| 2014/0059800 A1 * | 3/2014 | Bassett | A47L 9/0072 15/353 |
| 2014/0096683 A1 * | 4/2014 | Azwell | B01D 46/2403 95/268 |
| 2014/0165513 A1 * | 6/2014 | Oelpke | F02M 35/0216 55/385.1 |
| 2014/0283688 A1 * | 9/2014 | Fogelman | B01D 46/003 95/281 |
| 2016/0108782 A1 * | 4/2016 | An | F01M 13/04 123/573 |
| 2016/0186624 A1 * | 6/2016 | Meusel | F01L 1/047 96/400 |
| 2018/0141058 A1 | 5/2018 | Ortegren et al. | |

\* cited by examiner

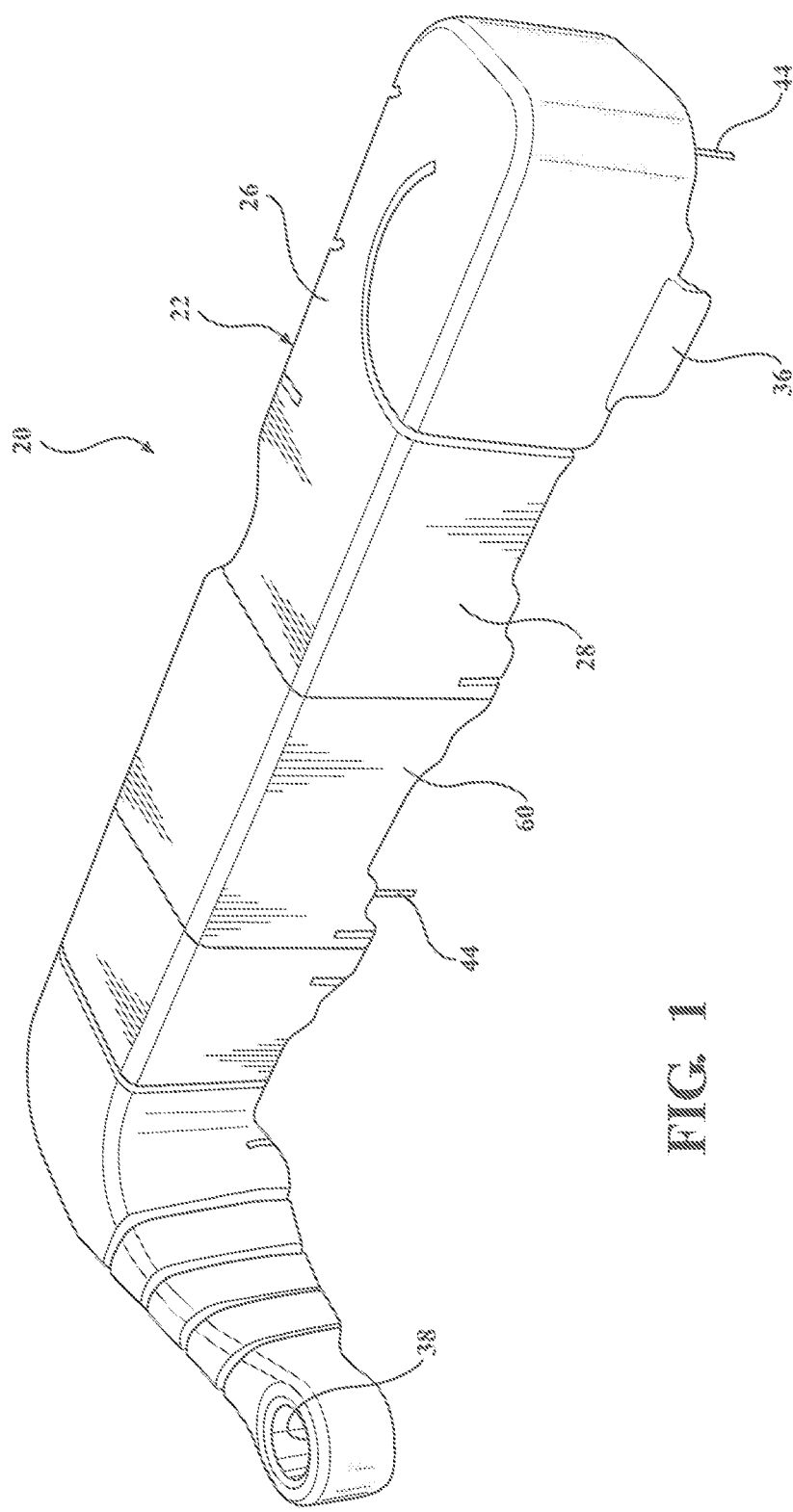

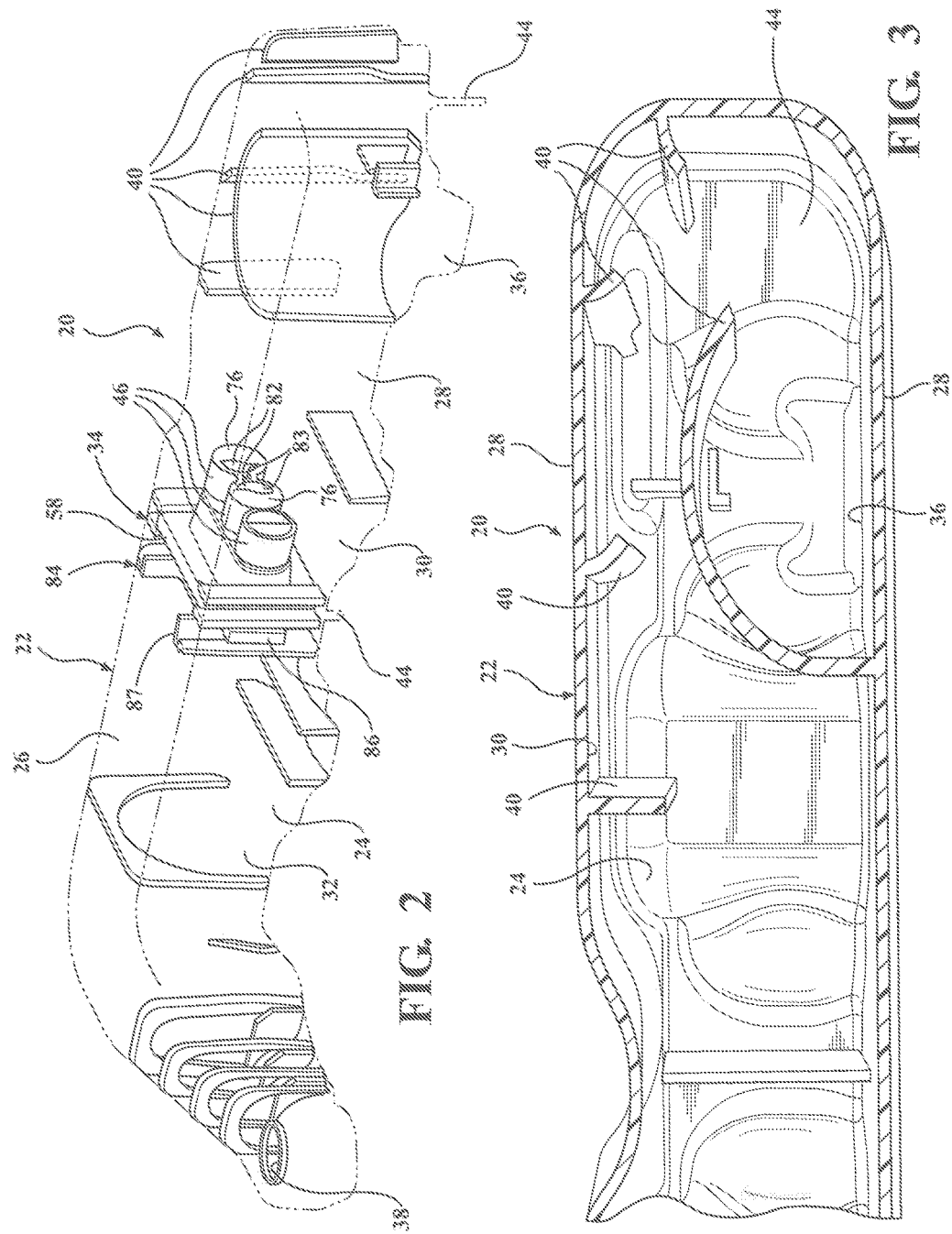

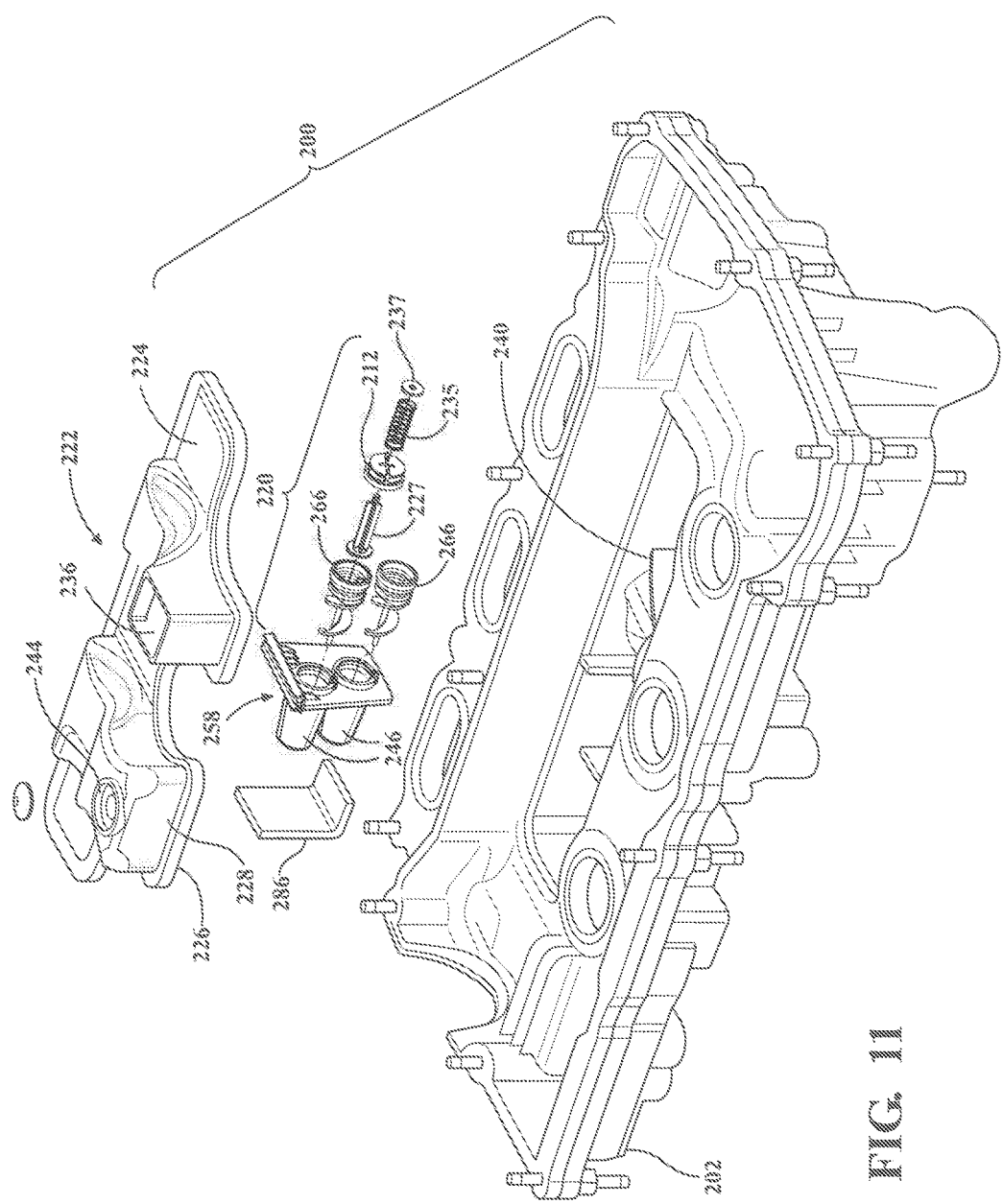

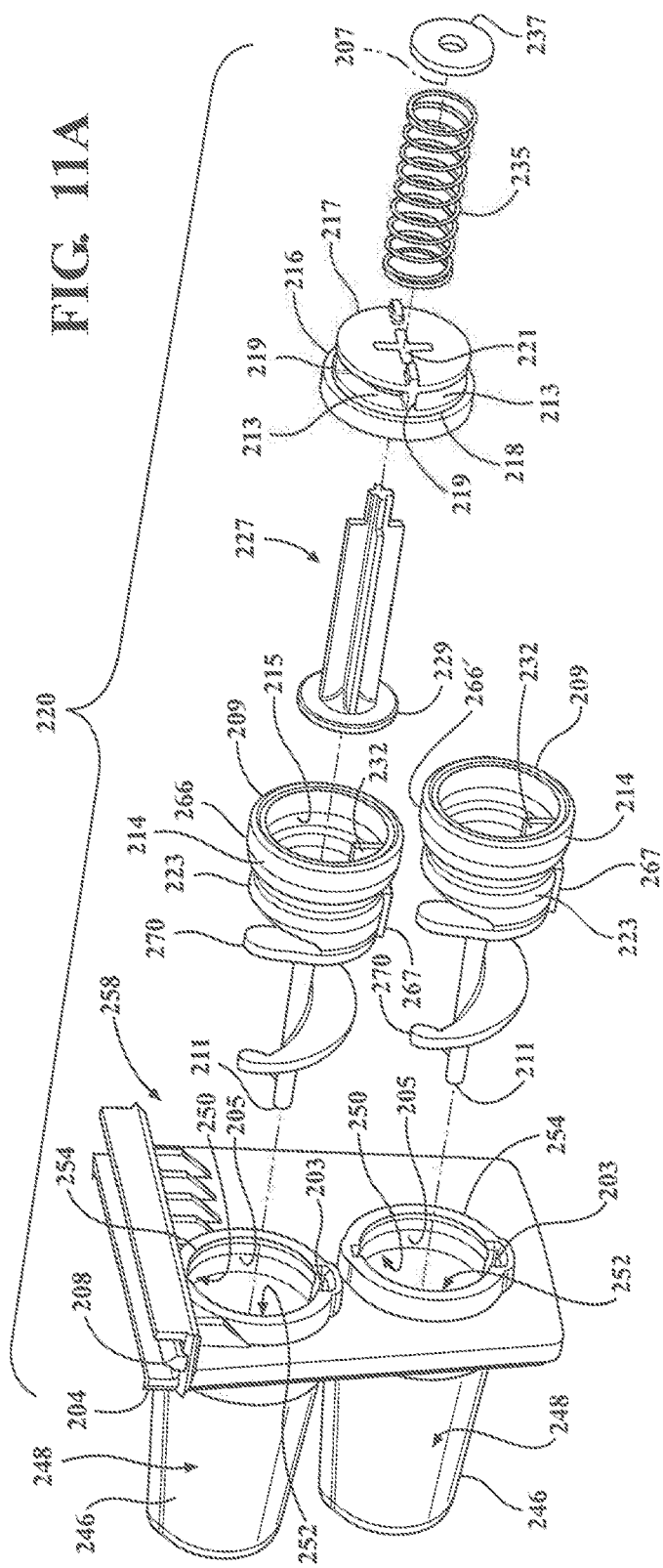

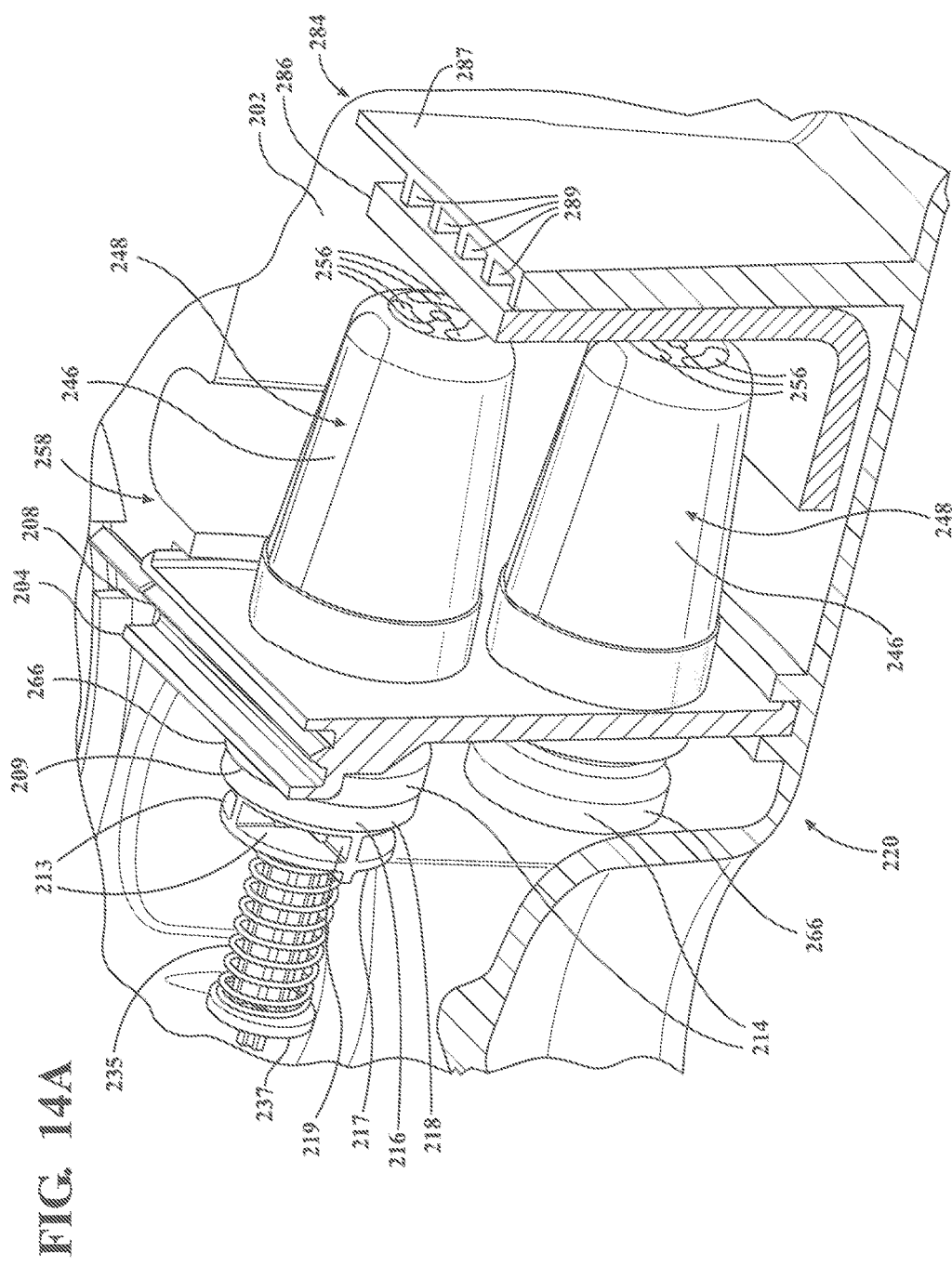

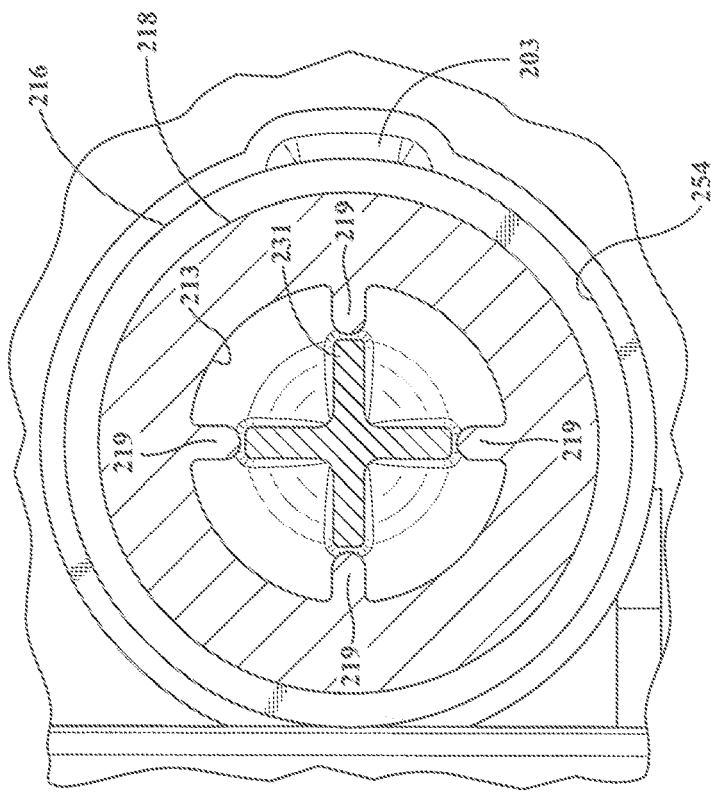
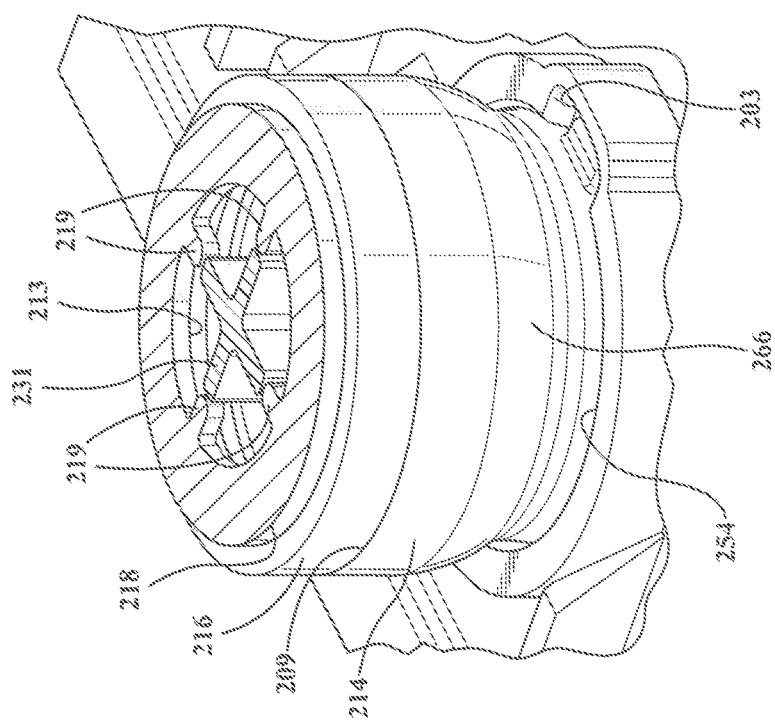
FIG. 16A
FIG. 16

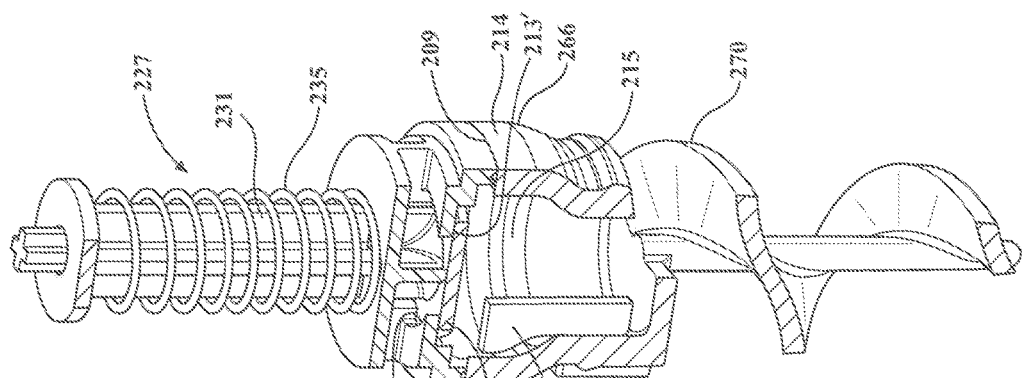
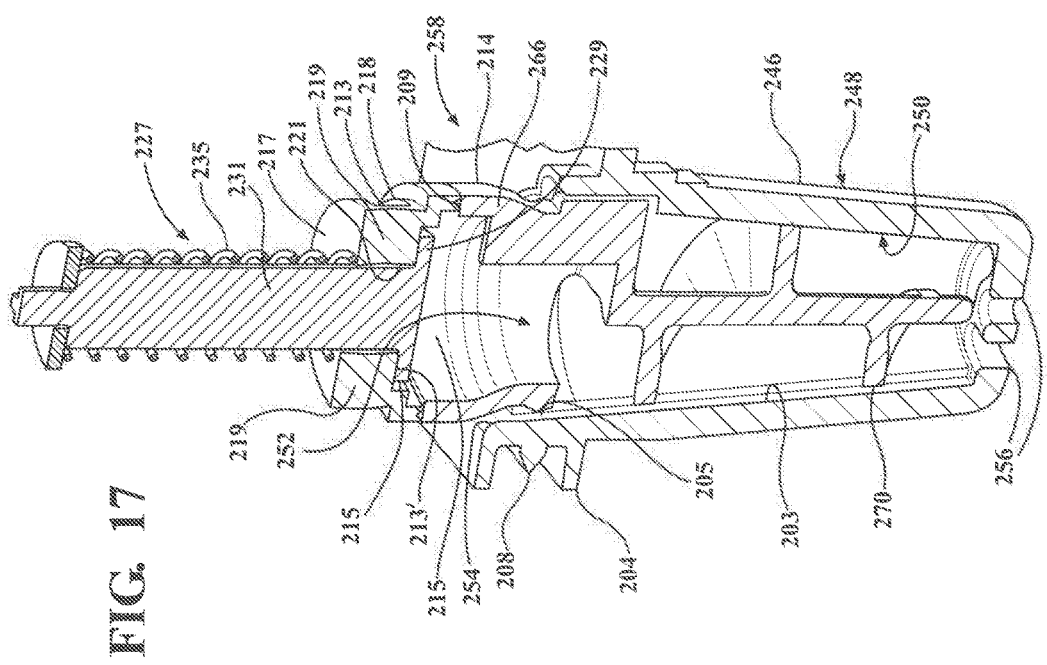

OIL SEPARATOR INCLUDING SPIRAL MEMBERS DEFINING HELICAL FLOW PATHS

CROSS REFERENCE TO RELATED APPLICATIONS

This application is a continuation-in-part application of U.S. patent application Ser. No. 15/264,899, filed Sep. 14, 2016, which claims the benefit of U.S. Provisional Patent Application Ser. No. 62/218,608, filed on Sep. 15, 2015, and titled "OIL SEPARATOR INCLUDING SPIRAL MEMBERS DEFINING HELICAL FLOW PATTERNS". The entire disclosures of each of the above applications are incorporated herein by reference.

TECHNICAL FIELD

The present disclosure relates generally to oil separators for separating oil from oil-laden gases. More particularly, the present disclosure relates to an oil separator that includes a plurality of spiral members that each define a helical flow path for guiding the oil-laden gases therethrough to separate oil from the oil-laden gases.

BACKGROUND

This section provides background information related to the present disclosure which is not necessarily prior art to the inventive concepts disclosed and claimed herein.

Internal combustion engines of vehicles, such as automobiles, typically include a combustion chamber where a fuel/air mixture is burned to cause movement of a set of reciprocating pistons, as well as a crankcase which contains the crankshaft driven by the pistons. During operation, it is normal for the engine to experience "blowby," wherein combustion gases leak past the pistons from the combustion chamber and into the crankcase or cam shaft housing. These combustion or blowby gases typically contain by-products of the combustion process including moisture, acids and an oil mist. Oil mist can further be generated as the result of moving components in the crankcase sloshing hot oil around. It is known for the oil mist to be carried by a crankcase ventilation system to the intake manifold of the internal combustion engine where it is then burned in the combustion chamber along with the fuel/air mixture. This often results in an undesirable increase in oil consumption.

To reduce the unnecessary consumption of oil, it is known to utilize cyclone-type oil separators to remove oil from the oil-laden blowby gases prior to entering the intake manifold. An example of such an oil separator is disclosed in U.S. Pat. No. 6,860,915 to Stegmaier et al. The oil separator includes a housing that defines a chamber. A partition assembly is disposed in the chamber and divides the chamber into an entry segment and an exit segment. The entry segment defines an inlet that extends into the chamber for receiving oil-laden gases from the crankcase, and the exit segment defines an outlet that extends into the chamber for expelling gases to the intake manifold. The partition assembly includes a channel that extends between a first opening in the entry segment and a second opening in the exit segment for passing the oil-laden gases between the entry and exit segments. A spiral member is disposed in the channel. The spiral member defines a helical flow path for guiding the oil-laden gases during passing of the oil-laden gases through the channel to separate the oil from the oil-laden gases. More specifically, small oil droplets pass and coalesce into larger droplets on the inner wall of the channel due to centrifugal forces created as the oil-laden gases pass through the helical flow path. The larger droplets are then directed by gravity to oil outlets and passed to a sump, which generally holds excess oil in the system.

To maximize the amount of oil that is separated by the helical flow path, it is desirable to maintain a relatively high velocity of the oil-laden gases passing therethrough while also providing a relatively large surface area of the inner walls of the channels for the oil to coalesce. Further, it is understood that the flow rate of the crankcase gas inside the helical flow path depends on the quantity of crankcase gas produced per unit time and on the flow cross-section of the flow path. The quantity of crankcase gas produced per unit time is largely related to the speed and load of the engine. To maximize oil separation efficiency, it is known to insert spiral members that have different cross-sectional areas into the channel to provide different flow cross-sections of the helical flow path depending on specific requirements. However, such a method does not actively adjust the effective flow cross-section of the helical flow path as the quantity of crankcase gas produced per unit time varies. Furthermore, oil separators are known to create a high pressure drop between the inlet and outlets, which interferes with the drainage of separated oil. More specifically, the high pressure drop interferes with the force of gravity pulling separated oil particles toward the oil outlets.

In view of the above, there remains a continuing need to develop further improvements to oil separators. Particularly, it remains desirable to provide improvements toward maximizing separation efficiency of oil from the oil laden gases actively during varying low flow and high flow running conditions. It is also desirable to provide an oil separator that has minimal pressure losses between the inlet and outlet. It is further desirable to provide an oil separator that provides greater system design flexibility over conventional oil separator designs.

SUMMARY

This section provides a general summary of the disclosure and is not a comprehensive disclosure of its full scope or all of its aspects and features. The description and specific examples disclosed in this summary are not intended to limit the scope of the inventive concepts disclosed herein.

It is an aspect of the disclosure to provide an oil separator that provides a low pressure loss between the inlet and outlet of the oil separator per unit flow rate.

It is another aspect of the present disclosure to provide an oil separator that automatically adjusts the flow area of the openings into the helical flow paths to increase the average velocity of the oil-laden gases flowing therethrough to increase the separation efficiency of oil from the oil-laden gases in direct response to varying flow rates.

It is another aspect of the disclosure to provide an oil separator that is simple in design, easy to manufacture and modular/scalable such that it may be used with numerous engine sizes and configurations.

In accordance with these and other aspects of the present disclosure, an oil separator is provided for separating oil from oil-laden gases, the oil separator includes a housing having a plurality of cavities, with each of the cavities extending between a proximal end and a distal end. A plurality of augers, each has a helical flight extending about a longitudinal central axis between an inlet end and an outlet end. The augers being disposed in separate ones of the cavities to form helical flow paths about the central longitudinal axes. At least one of the augers has an annular wall extending from the inlet end about the central longitudinal axis to bound an inlet chamber. An end cap, having an inlet, is fixed to the annular wall over the inlet chamber. A plunger valve has a valve head disposed in the inlet chamber, wherein a spring member is configured to bias the valve head into a closed position in sealed abutment with the end cap to perfect a seal over the inlet to inhibit the flow of oil-laden gases therethrough. The valve head is moveable within the chamber against the bias of the spring member to an open position away from the end cap in response to pressure being applied against the valve head sufficient to overcome the bias of the spring member.

In accordance with another aspect of the disclosure, the end cap can be provided with a through opening extending along the longitudinal central axis and the plunger valve can be provided with a valve stem extending from the valve head through the through opening, and wherein the spring member can be disposed about the valve stem.

In accordance with another aspect of the disclosure, the end cap can be provided with an annular outer periphery extending between upper and lower walls, with the through opening extending through the upper and lower walls and the inlet extending into the outer periphery and through the lower wall.

In accordance with another aspect of the disclosure, the valve stem can be provided having at least a portion with a non-circular outer peripheral surface, as viewed in cross-section taken transversely to the longitudinal central axis, with the through opening in the upper wall having a peripheral surface conforming at least in part with the non-circular outer peripheral surface of the valve stem to inhibit lateral play of the valve stem within the through opening in the upper wall.

In accordance with another aspect of the disclosure, the through opening in the lower wall has an enlarged peripheral surface relative to the valve stem to form the portion of the inlet extending through the lower wall between the valve stem and the enlarged peripheral surface of the through opening.

In accordance with another aspect of the disclosure, at least some of the helical flights can be provided having different helical pitches from one another to maximize the separating efficiency during varying flow rates.

In accordance with another aspect of the disclosure, at least one of the plurality of augers does not have a valve head disposed therein, wherein the at least one auger having a valve head disposed in the inlet chamber has a helical flight with a first helical pitch and the at least one auger not having a plunger head disposed therein has a helical flight with a second helical pitch, with the first helical pitch being greater than the second helical pitch.

In accordance with another aspect of the disclosure, the augers can be provided having one of a protrusion or a recess and the cavities can be provided having the other of a protrusion or a recess, with the protrusion and the recess being configured for a snap fit with one another to facilitate modular assembly.

In accordance with another aspect of the disclosure, the protrusion can be formed as an annular rib and the recess can be formed as an annular groove.

In accordance with another aspect of the disclosure, a protrusion can be provided to extend radially inwardly from the annular wall, with the protrusion forming a stop surface configured to confront the valve head to limit the movement of the valve head within the inlet chamber.

In accordance with another aspect of the disclosure, each of the cavities can be configured the same for interchangeable receipt of any one of the plurality of augers to facilitate modular assembly.

In accordance with another aspect of the disclosure, an oil separator for separating oil from oil-laden gases includes a housing having at least one cavity. An auger is disposed in at least one cavity, with the auger having a helical flight extending about a longitudinal central axis between an inlet end and an outlet end to form a helical flow path about the longitudinal central axis. At least one auger has an annular wall extending from the inlet end about the longitudinal central axis with an end wall fixed to the annular wall to bound an inlet chamber. The end wall includes an inlet extending into the inlet chamber to selectively allow the flow of oil-laden gases therethrough. A valve head is disposed in the inlet chamber and a spring member is configured to bias the valve head into a closed position to perfect a seal over the inlet to inhibit the flow of oil-laden gases therethrough. The valve head is moveable within the inlet chamber against the bias of the spring member to an open position in response to pressure being applied against the valve head sufficient to overcome the bias of the spring member.

Further aspects will become apparent to those possessing ordinary skill in the art from the description provided herein.

DRAWINGS

The drawings described herein are for illustrative purposes of presently preferred embodiments and are not intended to limit the scope of the present disclosure. Accordingly, the inventive concepts associated with the present disclosure will be more readily understood by reference to the following description and appended claims in combination with the accompanying drawings, wherein:

FIG. 1 is an isometric view of an oil separator according to an aspect of the disclosure;

FIG. 2 is an isometric view of the oil separator of FIG. 1 wherein the outer walls of the housing are presented as being transparent;

FIG. 3 is a top cutaway view of the oil separator of FIG. 1 illustrating the inlet of the oil separator and a plurality of baffles;

FIG. 11 is an exploded perspective view of a cam cover assembly including a modular oil separator according to another aspect of the disclosure;

FIG. 11A is an enlarged exploded perspective view of the modular oil separator of FIG. 11;

FIG. 14A is a cross-sectional view taken generally along the line 14A-14A of FIG. 14;

FIG. 16 is a partial cross-sectional perspective view of the modular oil separator taken generally through line 16-16 in FIG. 15 of an end cap and the valve plunger of the modular oil separator;

FIG. 16A is a plan view of the modular oil separator of FIG. 16;

FIG. 17 is a cross-sectional perspective view of the modular oil separator taken through a central longitudinal axis of the valve plunger with the valve head shown in a closed position;

FIG. 17A is a view similar to FIG. 17 with the cross-section being taken in laterally offset relation from the central longitudinal axis;

DESCRIPTION OF THE EXEMPLARY EMBODIMENTS

Figure 4:
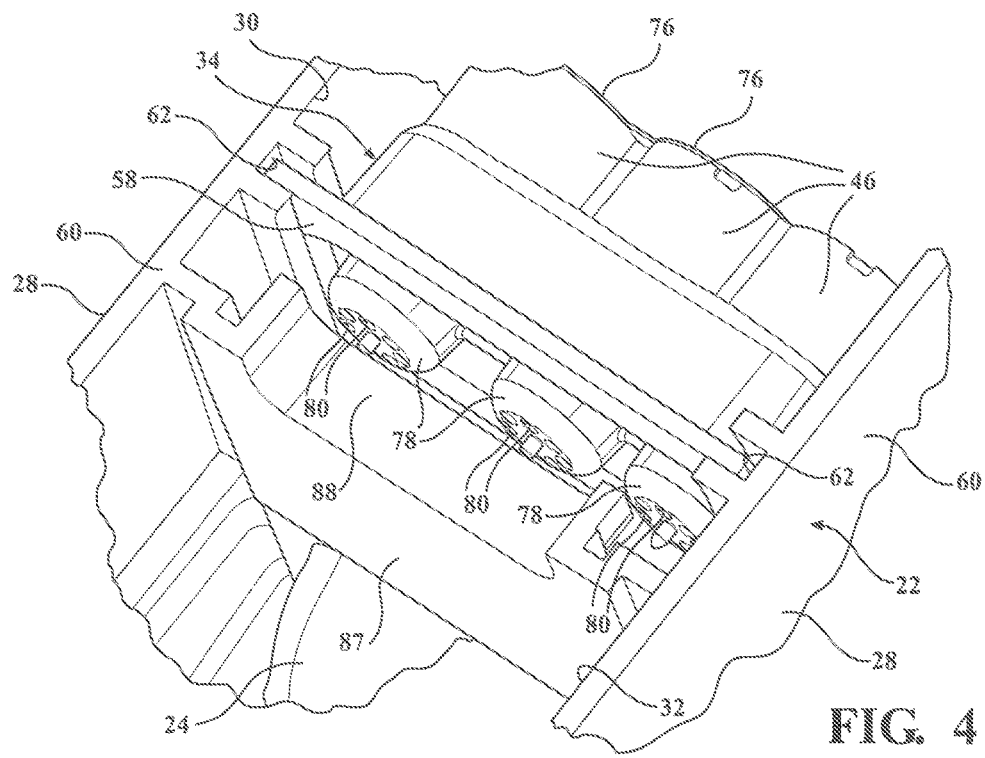
FIG. 4 is a perspective view of a partition assembly of the oil separator according to an aspect of the disclosure.
Figure 5:
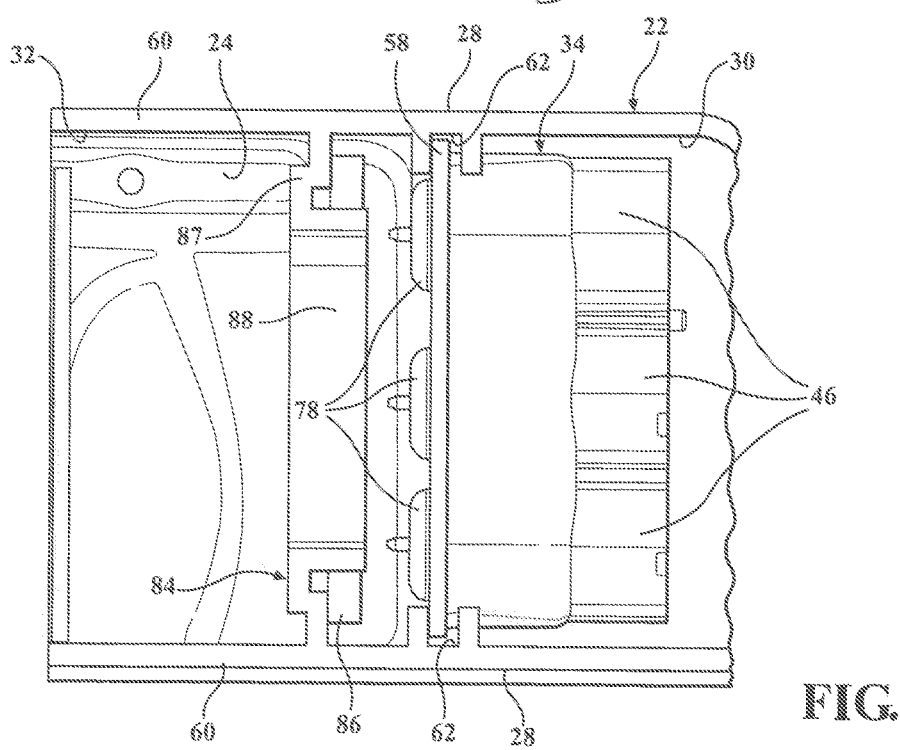
FIG. 5 is a top view of the partition assembly of FIG. 4.
Figure 6:
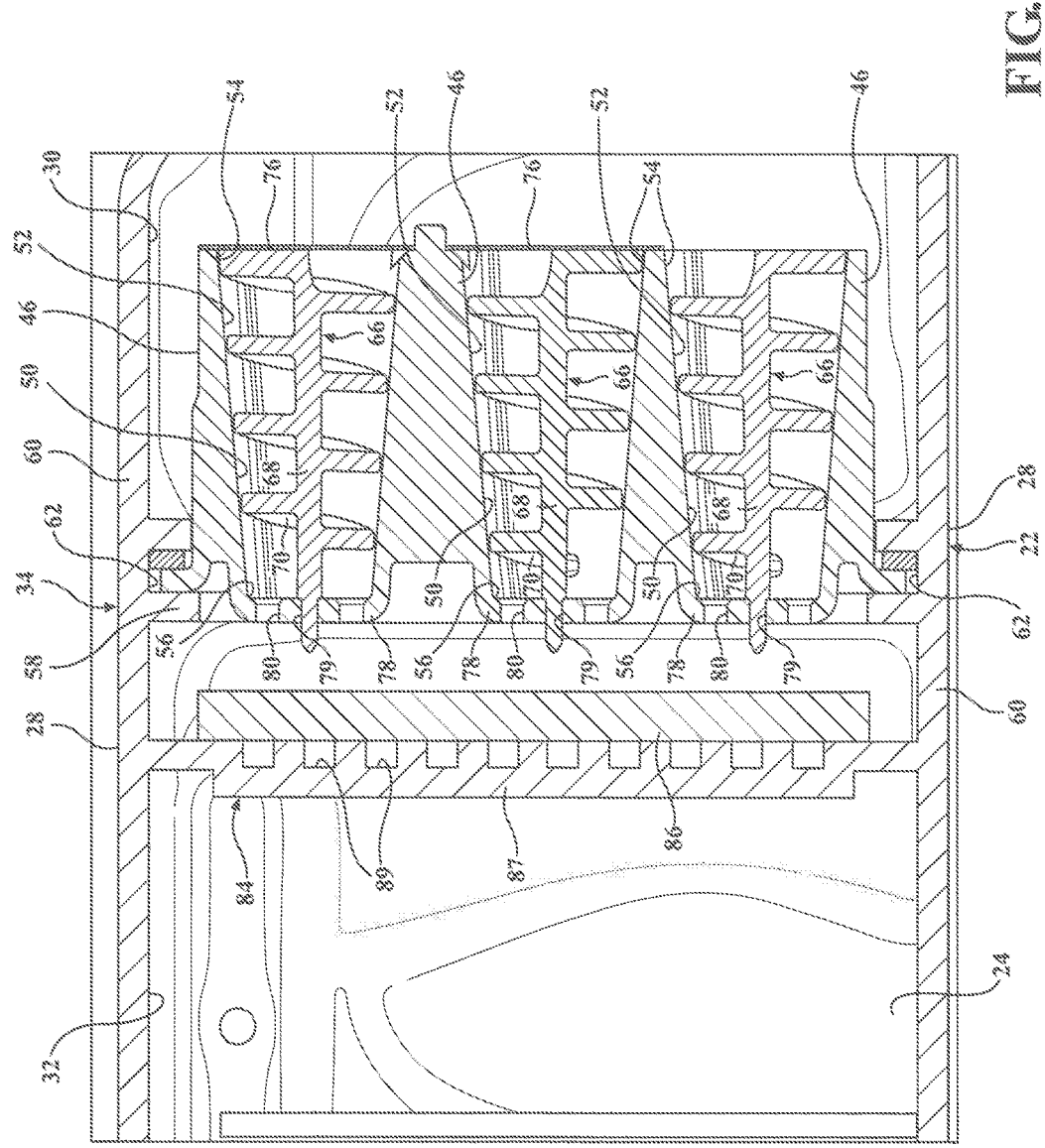
FIG. 6 is a front cutaway view of the partition assembly of FIG. 4 illustrating a configuration of a spiral member and valves.

Example embodiments will now be described more fully with reference to the accompanying drawings. Each of the example embodiments is directed to an oil separator for separating oil from oil-laden gases. The example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In general, the present disclosure is directed to one or more embodiments of an oil separator of the type well-suited for separating oil from oil-laden gases. The oil separator may be utilized to separate oil from gases of various devices such as, but not limited to, internal combustion engines of motor vehicles and refrigeration systems.

The oil separator in accordance with one aspect of the present disclosure includes a housing defining a chamber. A partition assembly is disposed in the chamber and divides the chamber into an entry segment and an exit segment. The entry segment defines an inlet that extends into the chamber for receiving oil-laden gases, and the exit segment defines an outlet that extends into the chamber for expelling gases.

The partition assembly includes a plurality of channels that each extend between a first opening in the entry segment and a second opening in the exit segment for passing the oil-laden gases between the entry and exit segments. A plurality of spiral members are each disposed in one of the channels. Each of the spiral members define a helical flow path for guiding the oil-laden gases in the helical flow path about the spiral member during passing of the oil-laden gases through the channels to separate the oil from the oil-laden gases.

According to an aspect of the disclosure, at least one valve can be connected to at least one of the openings of the channels. The stated valve is moveable between an open and closed position in response to a predetermined pressure being applied against the valve for maintaining the velocity of the oil-laden gases passing through the channels within a predetermined range.

According to another aspect of the disclosure, the oil separator further includes a fine mist separator assembly that includes a fibrous pad disposed in the exit chamber adjacent to and in alignment with the second openings for absorbing oil in the oil-laden gases immediately after the oil-laden gases have passed through the frames.

With specific reference to the figures, an exemplary embodiment of an oil separator 20 is generally shown. The exemplary embodiment of the oil separator 20 is described in operable connection with an internal combustion engine of a vehicle, however, it should be appreciated that the oil separator 20 could also be connected to other systems, e.g., a refrigeration system. With specific reference to FIGS. 1 and 2, the oil separator 20 includes a housing 22 that has a base 24, a top 26 and a pair of sidewalls 28 and defines a chamber 30, 32. A partition assembly 34 is disposed in the chamber 30, 32 and divides the housing 22 into an entry segment 30 and an exit segment 32. The entry segment 30 defines an inlet 36 that extends into the chamber 30, 32 for receiving oil-laden gases from the crank-case of the combustion engine into the chamber 30, 32. The exit segment 32 defines a gas outlet 38 that extends into the chamber 30, 32 for expelling gases from the chamber 30, 32 to an air intake assembly of the combustion engine.

A plurality of baffles 40 are disposed in the chamber 30, 32 in the entry segment 30 between the inlet 36 and the partition assembly 34. Each of the baffles 40 extend between the base 24 and the top 26 to define a labyrinth passage for guiding the oil-laden gases after the oil-laden gases have entered the chamber 30, 32 through the inlet 36. In operation, the baffles 40 separate the oil from the oil-laden gases during contact of the oil-laden gases with the baffles 40. At least one of the plurality of baffles 40 can be a "fish hook" style baffle that extends from the sidewall 28 in an arc shape over the inlet 36 which is particularly utilized to isolate splashing liquid oil that may be present during immediate entry of the oil-laden gases through the inlet 36. Further, at least one of the plurality of baffles 40 extends linearly from the sidewall 28. It should be appreciated that the shapes and positions of the baffles 40 provide for a swirling shape of the oil-laden gases passing through the labyrinth passage which aids in causing contact between oil particles and the baffles 40.

The base 24 of the housing 22 defines at least one oil outlet 44 in the chamber 30, 32 for expelling the oil that has been separated from the oil-laden gases of the crank-case into an oil pan of the combustion engine. In the exemplary embodiment, a plurality of oil outlets 44 are provided with at least one in each of the entry and exit segments 30, 32 of the chamber 30, 32, however, it should be appreciated that any number of oil outlets 44 could be defined along the base 24. It should further be appreciated that the base 24 may be sloped toward the oil outlets 44 to funnel the separated oil into the oil outlets 44.

As best presented in FIGS. 4-8, the partition assembly 34 includes a plurality of generally tapered tube-shaped frames 46 that extend in parallel relationship with one another. In the exemplary embodiment, three frames 46 are utilized, however, it should be appreciated that more or fewer could be used. Each of the frames 46 presents an outer surface and an inner surface 50. The inner surface 50 of each of the frames 46 defines a channel 52 that extends between a first opening 54 in the entry segment 30 and a second opening 56 in the exit segment 32 for passing the oil-laden gases between the entry segment 30 and the exit segment 32 after the oil laden gases have passed through the labyrinth passage 42. A connecting member 58 connects the plurality of frames 46 to one another and interconnects the frames 46 to the housing 22.

Each of the sidewalls 28 includes a modular segment 60 that is removeably connected to the base 24 and the remaining portion of the sidewall 28. The modular segments 60 extend in spaced and parallel relationship with one another. A pair of slots 62 are defined by opposing modular segments 60 of the sidewalls 28 in the chamber 30, 32 and in alignment with one another. The slots 62 each receive an edge of the connecting member 58 to position the frames 46 in place. It should be appreciated that the modular construction of the modular segments 60 and connecting member 58 provide for simple and fast manufacturing steps in assembling the modular segments 60 and connecting member 58.

As best presented in FIGS. 6-9, a plurality of spiral members 66 are each disposed in one of the channels 52 of each of the frames 46. Each of the spiral members 66 includes a shaft 68 and a flight 70. The shaft 68 extends between a proximal end disposed adjacent to the first opening 54, and a distal end disposed adjacent to the second opening 56. The flight 70 extends in a spiral shape about the shaft 68 and defines a helical flow path for guiding the oil-laden gases during passing of the oil-laden gases through the channels 52 to further separate the oil from the oil-laden gases during contact of the oil-laden gases with the frame 46. More specifically, centrifugal forces are produced as the oil-laden gases pass through the helical flow path, which forces small oil droplets to coalesce into larger droplets on the inner surface 50 of the frame 46. After the droplets have coalesced, gravity causes them to flow toward the oil outlets 44 in their liquid state.

Figure 8:
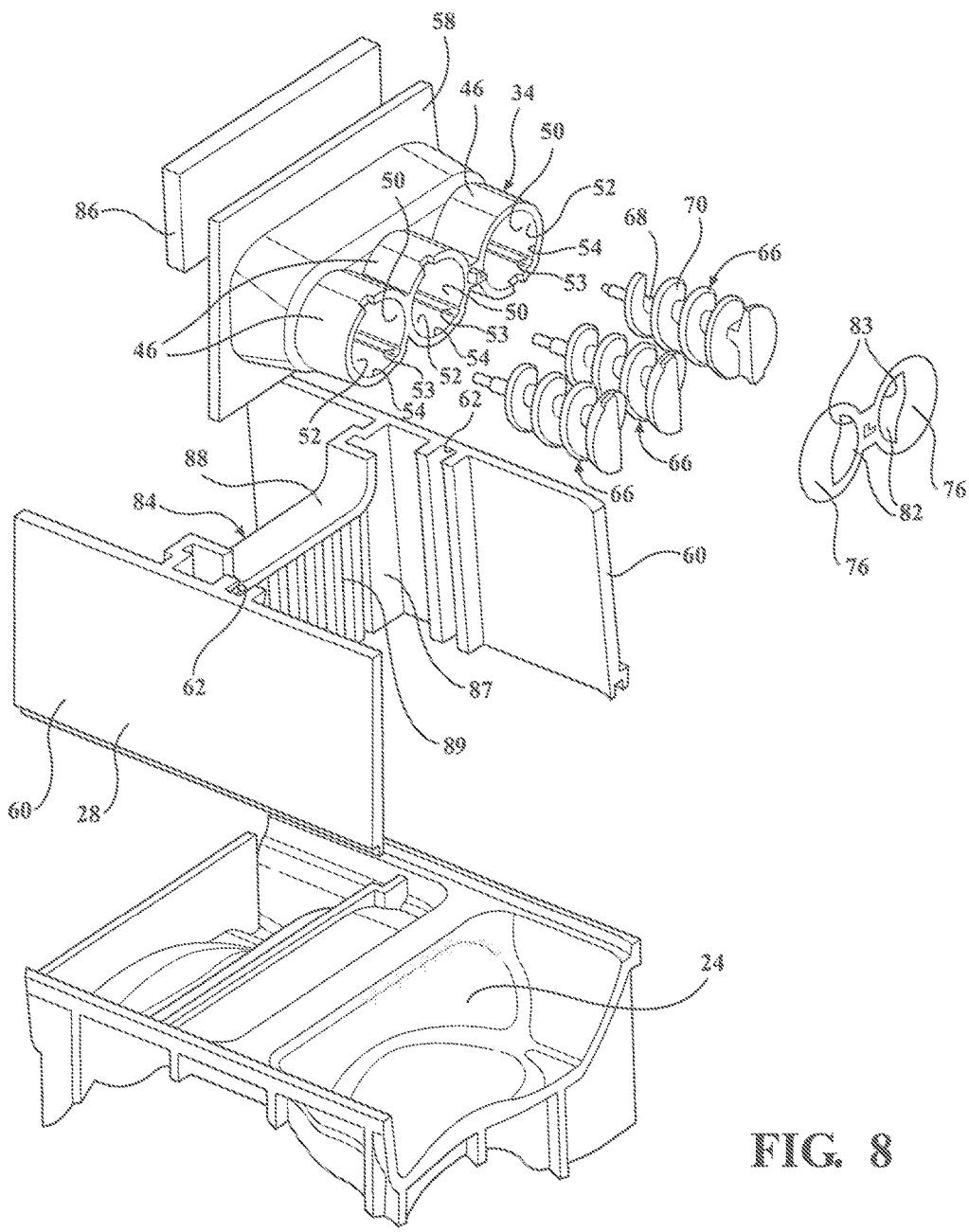
FIG. 8 is an exploded isometric view of the partition assembly of FIG. 4 illustrating a modular configuration of the partition assembly.

As best shown in FIG. 8, the inner surface 50 of each of the frames 46 defines an oil indentation 53 that extends linearly between the first opening 54 and the second opening 56 for passing the oil that has been separated from the oil-laden gases by the channel 52 axially toward the at least one oil outlet 44 in the entry segment 30 of the housing 22. Further, the frames 46 extend parallel to the base 24, and the inner surface 50 of each of the frames 46 has a generally frustoconical shape with the first opening 54 having a larger diameter than the second opening 56 for passing the oil that has been separated from the oil-laden gases at a downward angle via the oil indentation 53 into the entry segment 30 to further aid in removing separated oil from channels 52.

Figure 7:
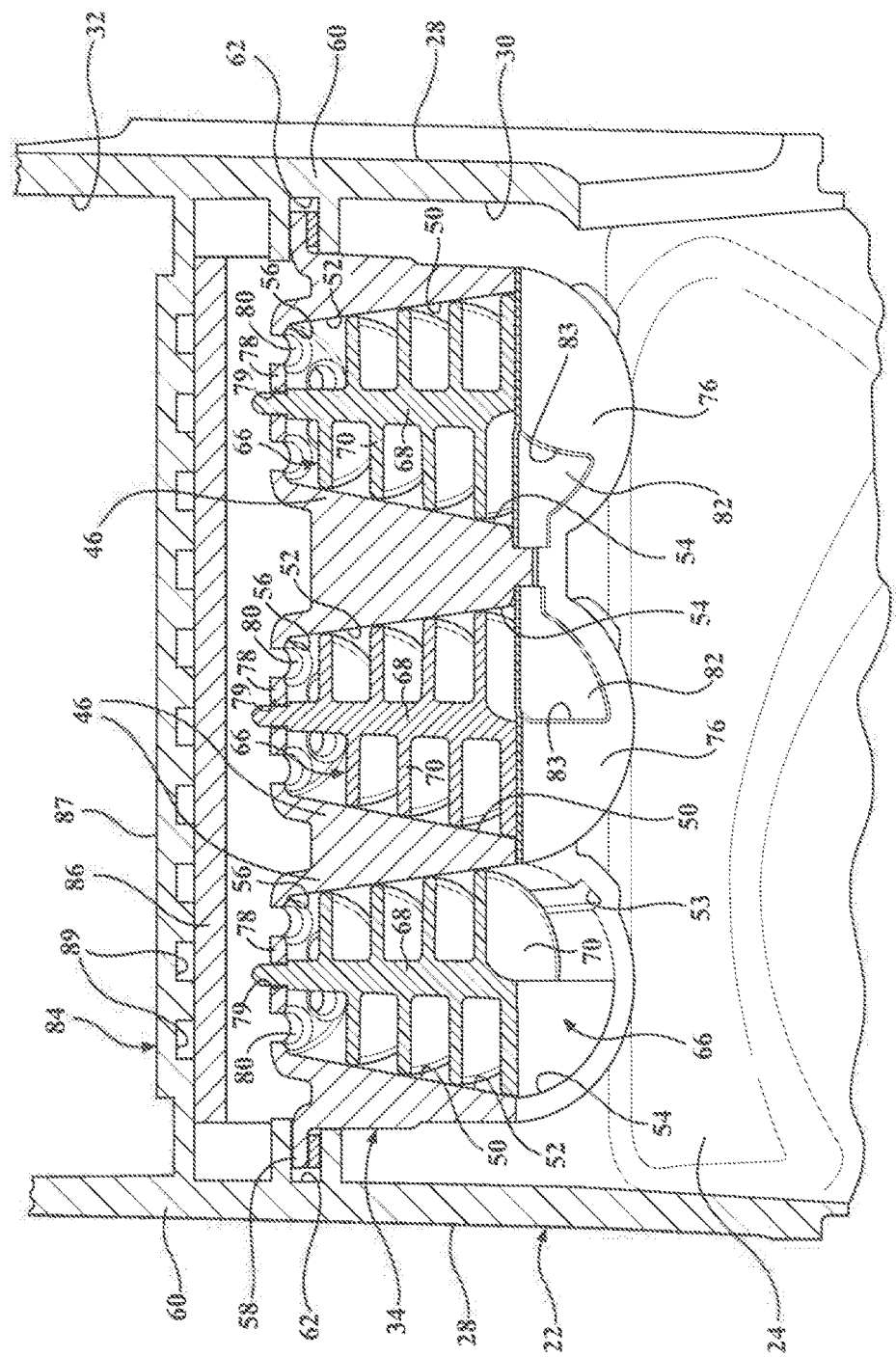
FIG. 7 is a front perspective view of the partition assembly of FIG. 4 illustrating a configuration of a spiral member and a first embodiment of valves and upstream plates.
Figure 9:
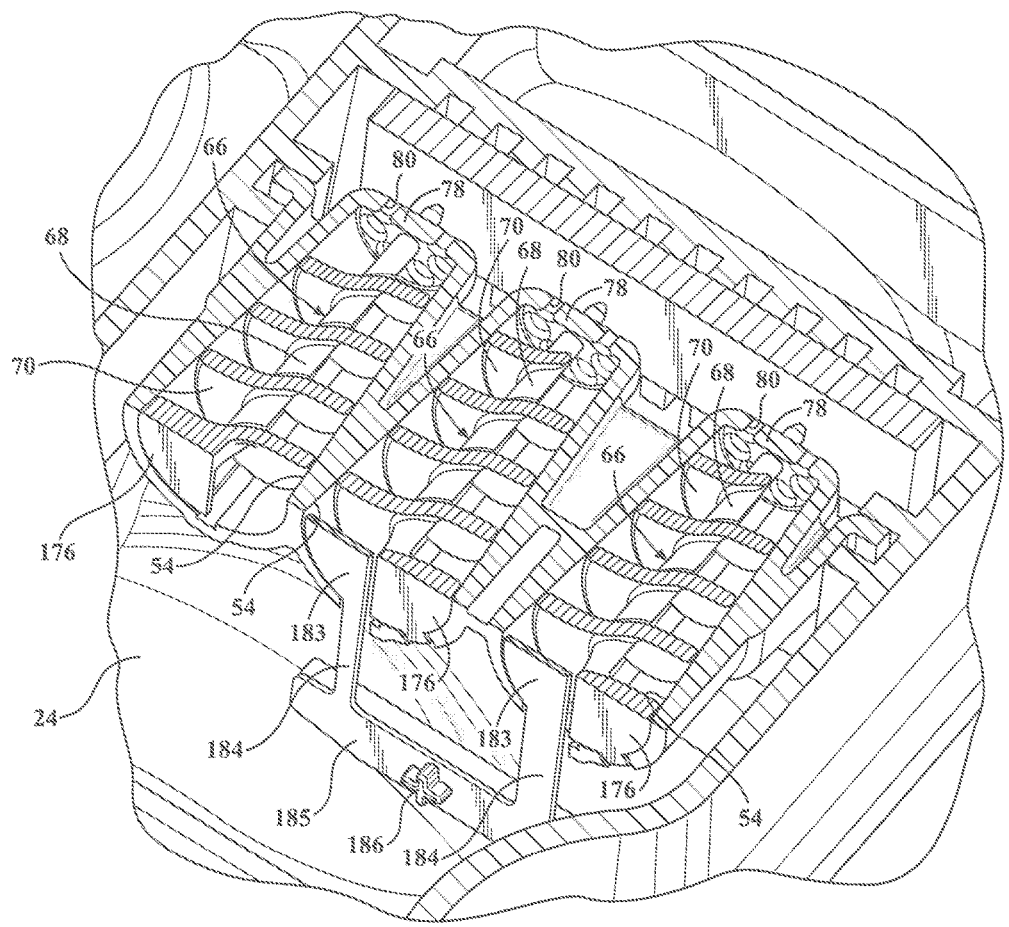
FIG. 9 is a perspective cutaway view of a partition assembly illustrating a second embodiment of valves and upstream plates.

As best presented in FIGS. 7-9, a plurality of upstream plates 76, 176 each cover over one of the first openings 54 of the frames 46 and a plurality of downstream plates 78 each cover over one of the second openings 56 of the frames 46. Each of the downstream plates 78 defines a central hole 79 that can receive the distal end of the shaft 68 of one of the spiral members 66 for securing the member to the downstream plates 78. It should be appreciated that the distal end of the shaft 68 could be connected to the downstream plates 78 in other ways. Each of the downstream plates 78 further defines a plurality of nozzle holes 80 that are disposed circumferentially about the center hole 79 for guiding the oil-laden gases therethrough after the oil-laden gases have passed through the helical path defined by the spiral member 66. It should be appreciated that the proximate location of the nozzle holes 80 near the end of the helical flow path causes the gases to flow through only a portion of the nozzles due to the shape of the flow path of the gases provided by the helical flow path. This causes the nozzle holes 80 to operate "artificially small", i.e., the area through which the gases pass through the nozzle holes 80 is smaller than the total area of the nozzle holes 80, thereby allowing the nozzle holes 80 to be formed with relatively large diameters. This advantageously reduces the pressure drop between the entrance and exit segments 30, 32 of the chamber 30, 32, allowing oil to more easily escape from the oil outlets 44.

At least one valve 82, 182 is connected to at least one of the openings 54, 56 of the channels 52. The valves 82, 182 are moveable between an open and closed position in response to a predetermined pressure being applied against the valve 82, 182. The predetermined pressure is provided as a result of the pressure difference between the entrance and exit segments 30, 32 of the chamber 30, 32, which correlates with the quantity of crankcase gases produced per unit time. To maximize the amount of oil that is separated by the helical flow path, it is desirable to maintain a relatively high velocity of the oil-laden gases passing therethrough while optimizing the surface of area of the inner walls of the channels 52 that the gases are exposed to, thereby increasing the amount of oil that coalesces against the inner surface 50 of the frame 46. It is understood that the flow rate of the oil-laden gases inside the helical flow path depends on the quantity of the oil-laden gases produced by unit time by the engine per unit time and on the flow cross-section of the helical flow path. Thus, the moveable valves 82, 182 ensure that the gases flow through the channels 52 within a predetermined velocity range as the quantity of the oil-laden gases produced per unit time varies. More specifically, when the quantity of oil-laden gases decreases, the valves 82, 182 are biased closed, and when the quantity of oil-laden gases increases, the valves 82, 182 are forced open.

In the exemplary embodiments, two valves 82, 182 are provided, each over one of the first openings 54, thereby leaving one of the first openings 54 open at all times. It should be appreciated that more or fewer valves 82, 182 could be utilized. The plurality of valves 82, 182 are each biased in a closed position, and moveable to an open position for opening the first opening 54 in response the predetermined pressure being applied. More specifically, the valves 82, 182 move inwardly in response to the predetermined pressures being applied. In order to provide the inward bending movement, the valves 82 could be made of various flexible materials or could be biased shut by way of one or more biasing mechanisms, including, but not limited to, a spring.

According to a first embodiment of the upstream plates 76 and valves 82 best illustrated in FIGS. 7 and 8, each of the upstream plates 76 defines a mouth 83 that extends into the channel 52. The plurality of valves 82 are each flexibly and pivotally connected to one of the upstream plates 76 along an edge of each of the valves 82. The valves 82 each overlie one of the mouths 83 and are shaped and sized substantially the same as the mouth 83 which they overlie such that they close the mouths 83 while in the closed position and may flex into the channel 52 toward the open position in response to the predetermined pressure being applied.

Figure 10:
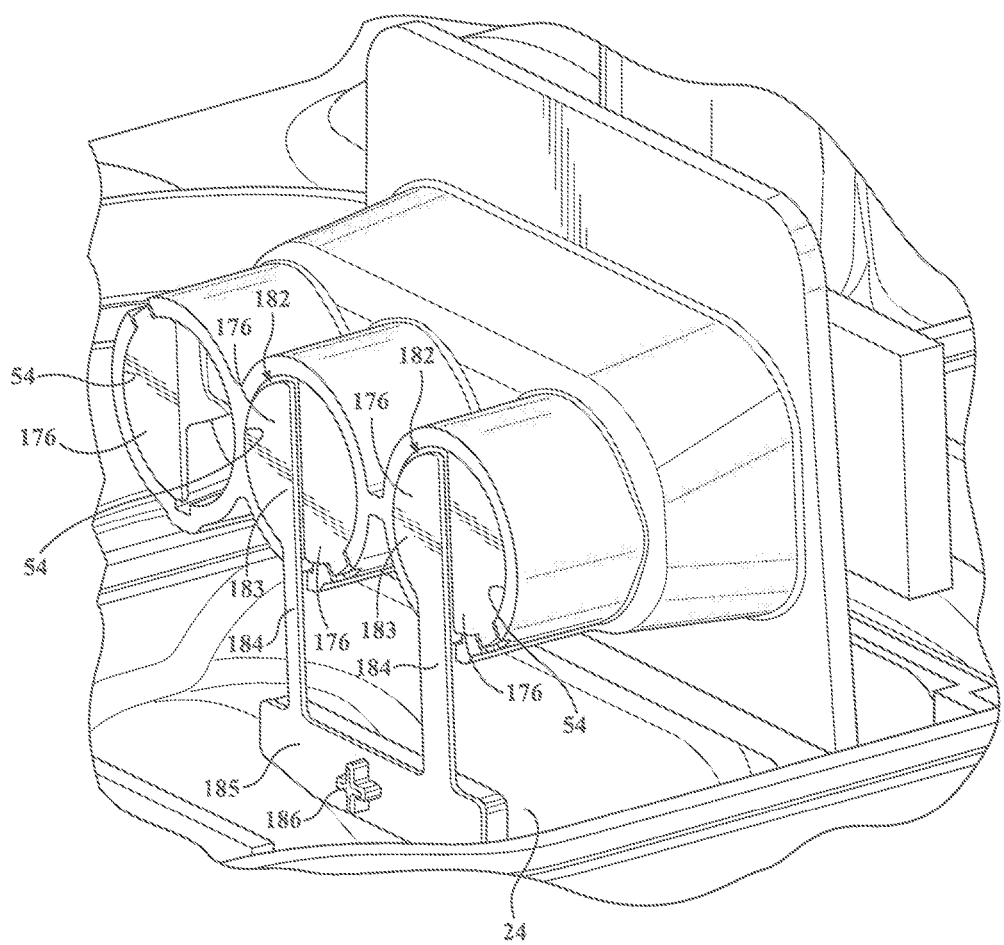
FIG. 10 is a perspective view of the partition assembly of FIG. 9 further illustrating the second embodiment of valves and upstream plates.
Figure 11B:
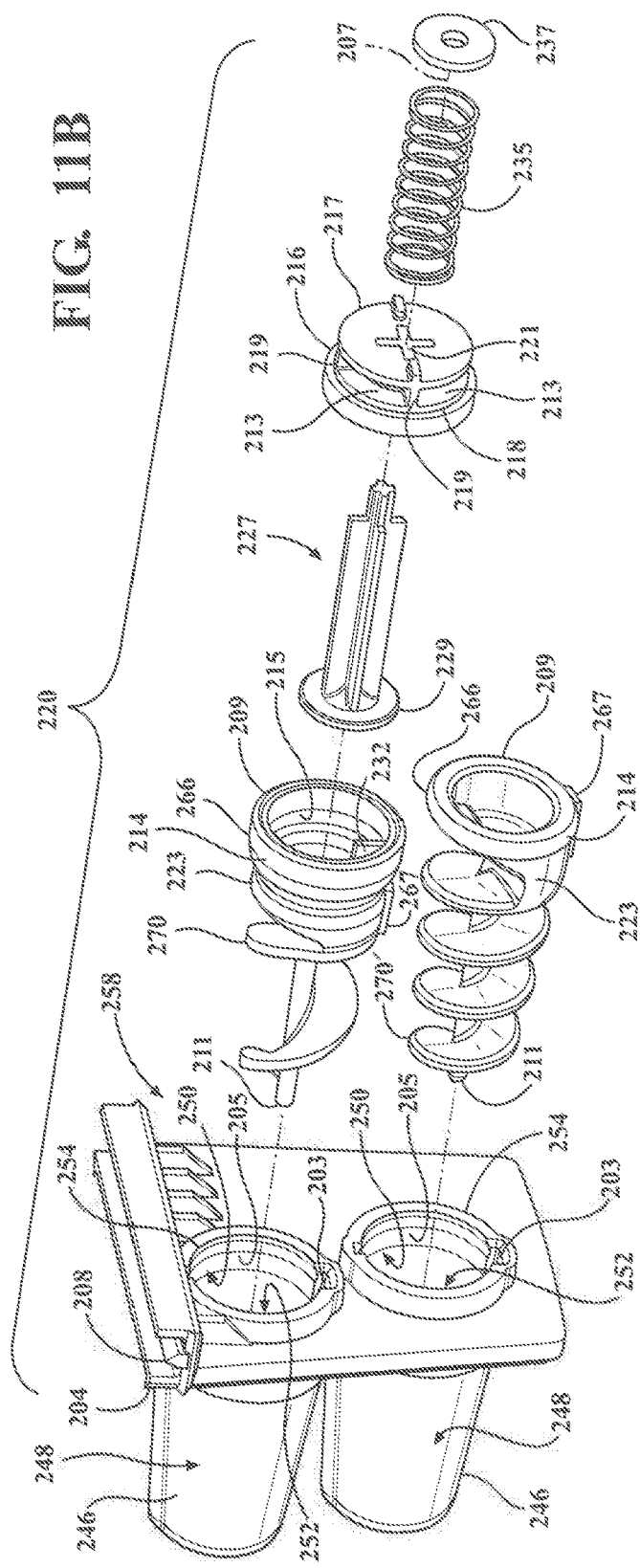
FIG. 11B is a view similar to FIG. 11A illustrating a further aspect of the modular oil separator being able to include augers having different flight configurations.
Figure 12:
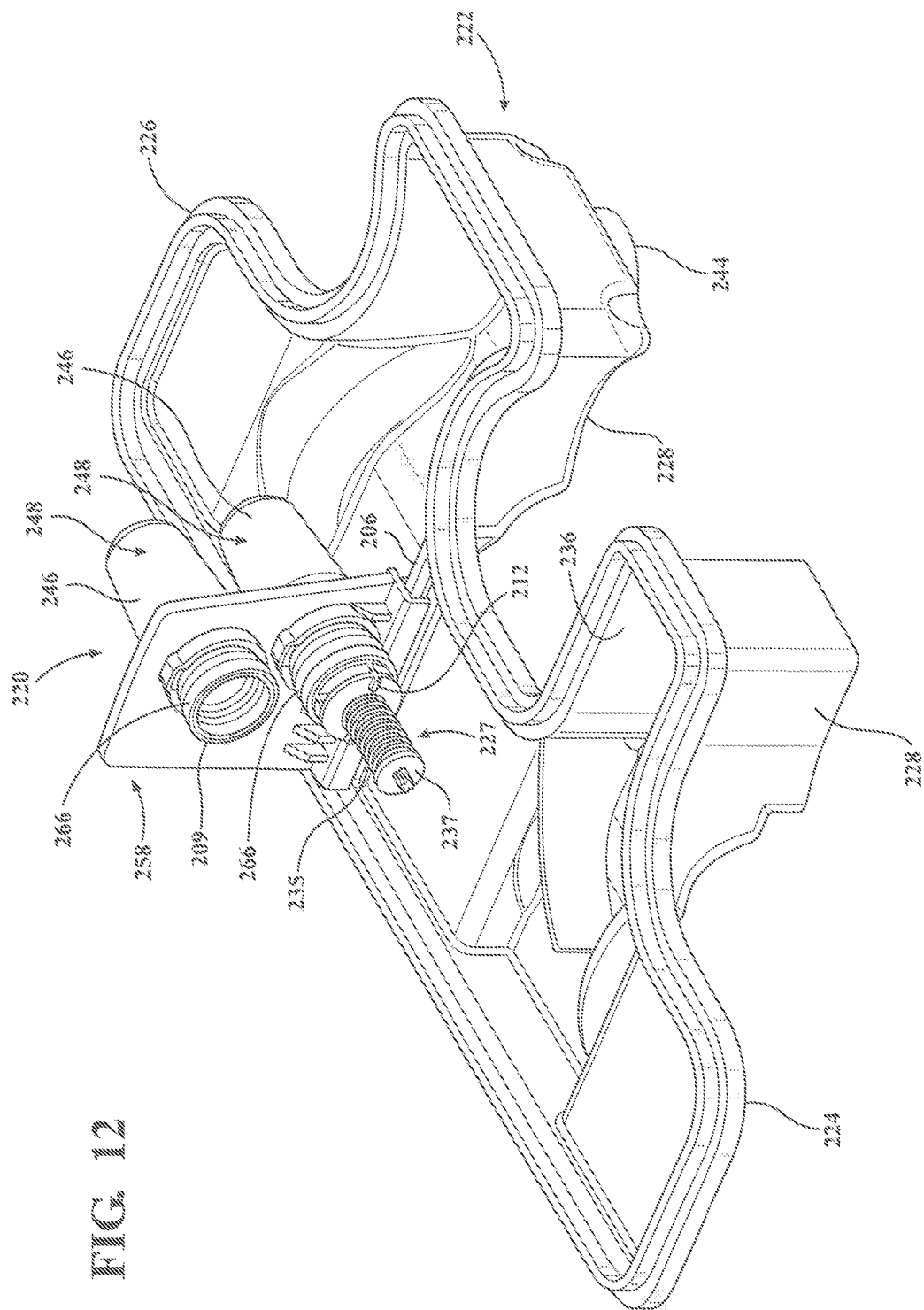
FIG. 12 is a perspective view of the modular oil separator shown fixed to an oil separation cover of the cam cover assembly of FIG. 11.
Figure 14:
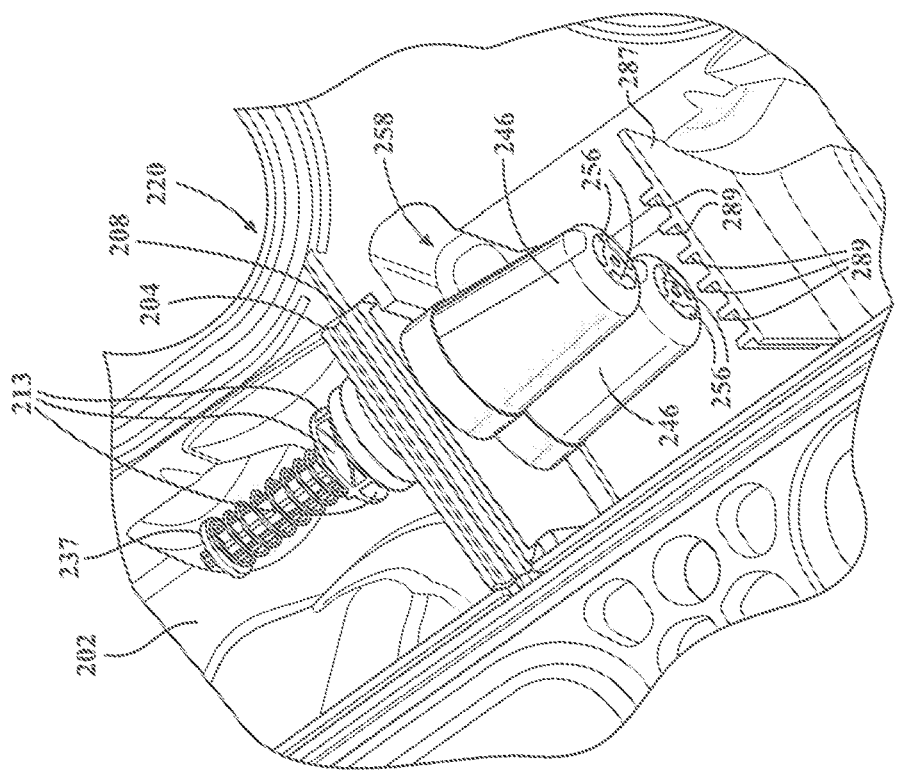
FIG. 14 is a view similar to FIG. 13 showing the modular oil separator shown fixed to the attachment region of the cam cover.
Figure 13:
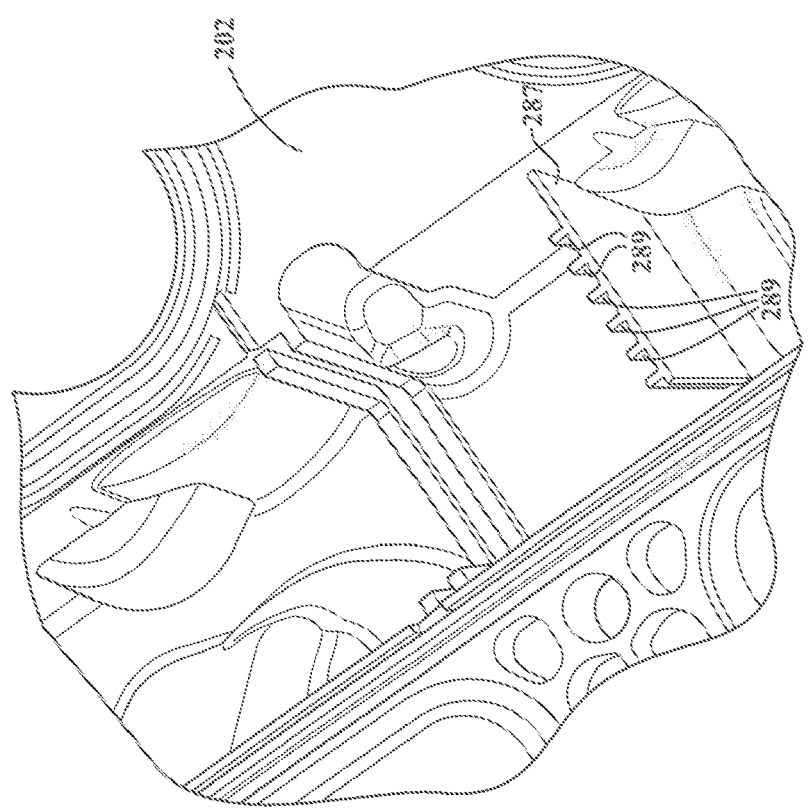
FIG. 13 is a partial perspective view of a cam cover of the cam cover assembly of FIG. 11 illustrating an attachment region of the cam cover configured for attachment of the modular oil separator thereto.
Figure 14B:
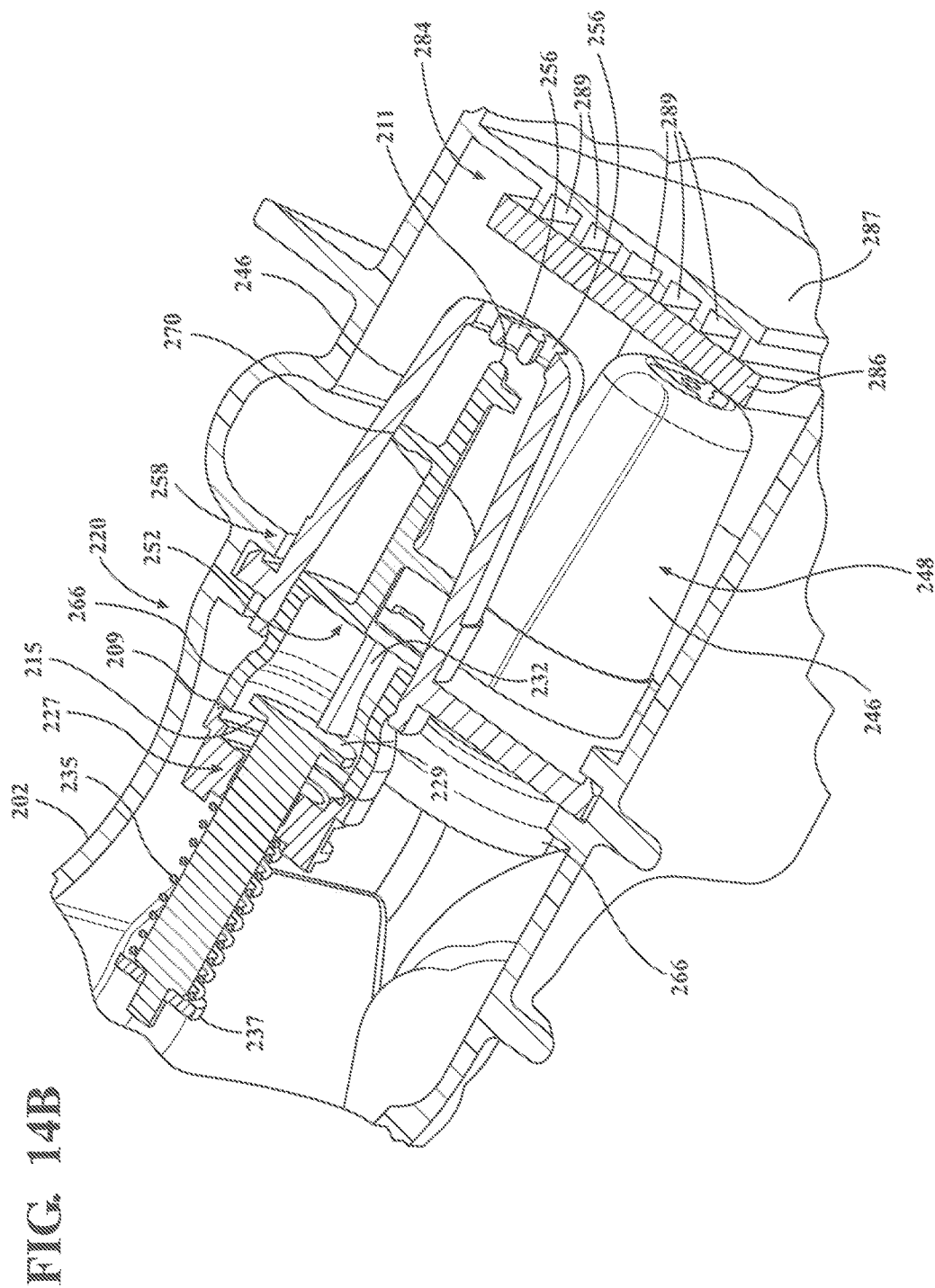
FIG. 14B is a cross-sectional view taken generally along the line 14B-14B of FIG. 14 with a valve head of the modular oil separator shown in an open position.
Figure 15A:
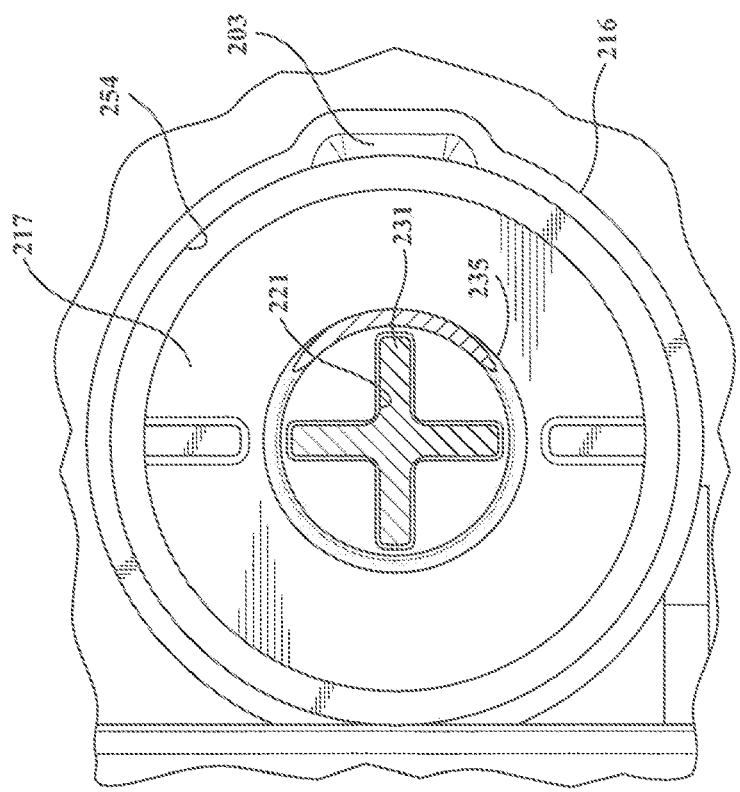
FIG. 15A is a plan view of the modular oil separator of FIG. 15.
Figure 15:
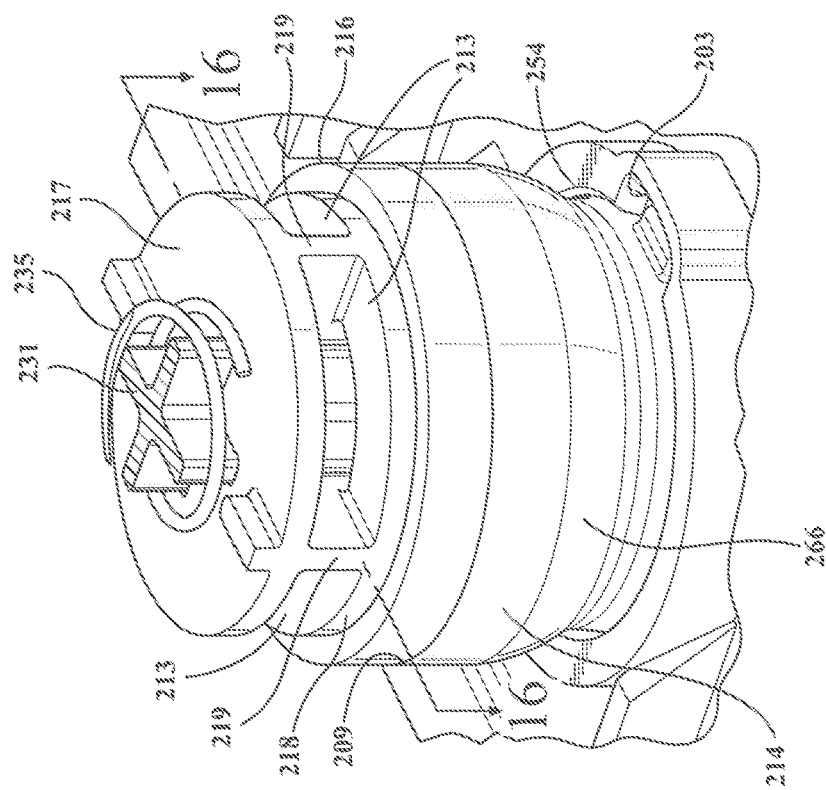
FIG. 15 is a partial cross-sectional perspective view of the modular oil separator taken through a valve plunger and spring of the modular oil separator.
Figure 18A:
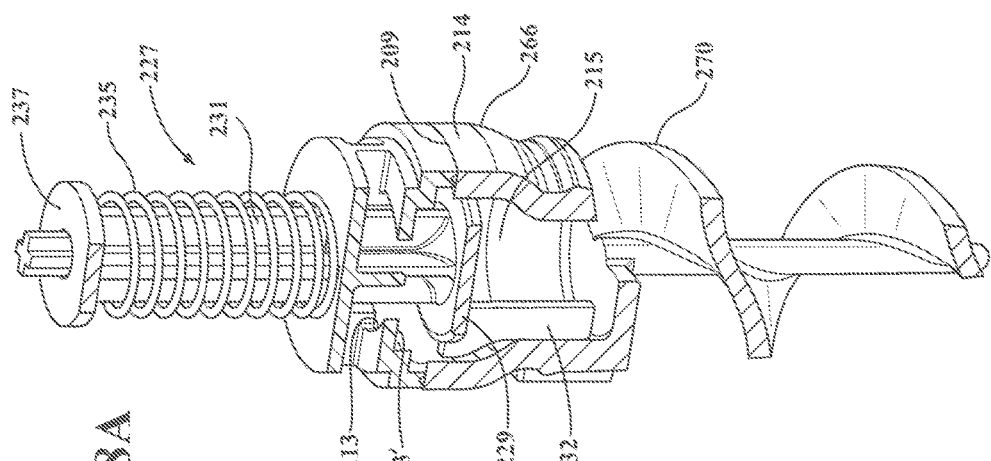
FIG. 18A is a view similar to FIG. 18 with the cross-section being taken in laterally offset relation from the central longitudinal axis.
Figure 18:
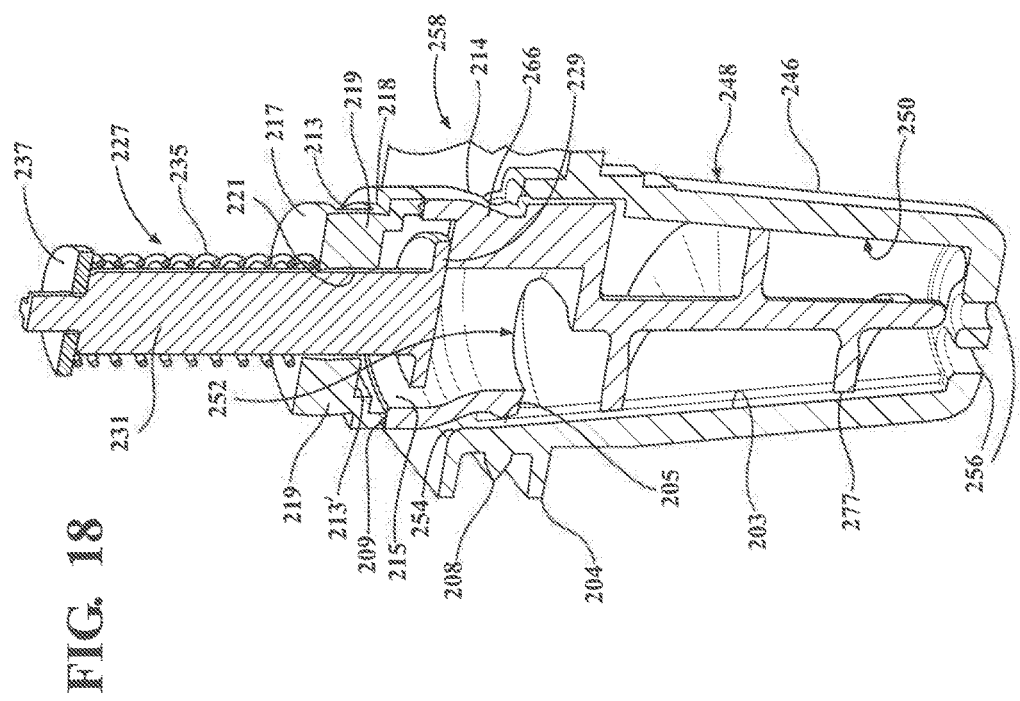
FIG. 18 is a view similar to FIG. 17 with the valve head shown in an open position.

According to a second embodiment of the upstream plates 176 and valves 182 illustrated in FIGS. 9 and 10, the upstream plates 176 are each integrally part of one of the spiral members 70. Furthermore, a mouth 183 into the opening 54 is defined between each of the upstream plates 176 and the inner surface 50 of the frame 46. The plurality of valves 182 each have a face portion 183 that is shaped substantially the same as a mouth 183 which they overlie such that they close the mouth 183 while in the closed position. Each of the valves 182 further includes a neck portion 184 that extends downwardly from the face portion 183. The neck portions 184 are each connected to a cross-member portion 185 that extends generally transversely to the neck portion 184 and interconnects the neck portions 184. The neck portion 184 of each of the valves 182 is flexibly and pivotally connected to the cross-member portion 185 such that the neck portion 184 may move into the channel 52 toward the open position in response to the predetermined pressure being applied. A fastener 186 connects the cross-member portion 185 to the base 24 of the housing 22. It should be appreciated that various types of fasteners may be utilized including, but not limited to, bolts and screws. Furthermore, the width, thickness and material of the neck portions 184 may vary to adjust the pressure required to move the neck portions 184 to open the channels 52.

As illustrated in the figures, each mouth 83, 183 is sized differently than the mouths 83, 183 positioned adjacent thereto such that opening the valves 82, 182 may be staged depending on the quantity of crankcase gasses produced per unit time, thereby optimizing the separation efficiency of the oil separator 20. It is understood that separated efficiency means the amount of oil that is extracted from the oil-laden gasses. Therefore, the valves 82, 182 may be opened to complement the helical flow path that corresponds with the first opening 54 that is always opened. Varying the predetermined pressure may be accomplished by constructing the valves 82, 182 of flexible materials that have different spring constants from one another or utilizing springs that have different spring constants.

As best presented in FIGS. 2 and 4-8, a fine mist separator assembly 84 is disposed in the exit chamber 30, 32 for further separating oil from the oil-laden gases after the oil-laden gases have passed through the frames 46. The fine mist separator assembly 84 includes a generally rectangular-shaped fibrous pad 86 that is porous and disposed adjacent to and in alignment with the second openings 56 of the frames 46 for further absorbing oil in the oil-laden gases to further separate oil from the oil-laden gases. In the exemplary embodiment, the fibrous pad 86 is made of a nonwoven nylon felt material, however, it should be appreciated that other materials could be utilized without departing from the scope of the subject disclosure. Additionally, the fibrous pad 86 could have other shapes, e.g., a triangular shape.

The fine mist separator assembly 84 also includes a generally rectangular-shaped impactor wall 87 that is disposed adjacent to the fibrous pad 86 between the sidewalls 28. The impactor wall 87 defines a plurality of indentations 89 that extend downwardly toward the base 24 for further separating the oil from the oil-laden gases during contact of the oil-laden gases with the impactor wall 87, and for directing the separated oil toward the base 24. The impactor wall 87 extends between the modular segments 60 of the sidewalls 28. The impactor wall 87 also includes a flange 88 that extends parallel to the base 24 over the fibrous pad 86 for limiting upward movement of the fibrous pad 86 to secure the fibrous pad 86 adjacent to the second openings 56. During operation, oil particles are separated from the gasses by the impactor wall 87 and are directed downwardly by the indentations 89. Meanwhile, "clean" gases pass over the flange 88 into the exit segment 32 of the chamber 30, 32 toward the gas outlets 38. It should be appreciated that the fine mist separator assembly 84 could be configured without the fibrous pad 86, causing the oil-laden gases to collide with the impactor wall 87 without passing through the fibrous pad 86.

According to an aspect of the disclosure, one or more passages could be defined by the partition assembly for allowing oil that has been separated by the fibrous pad 86 and/or impactor wall 87 to pass between the entry and exit segments 30, 32 of the chamber 30, 32. The passages could be defined between the base 24 and sidewalls 28.

A plurality of lower walls 90 extend upwardly from the base 24 in the entry and exit segments 30, 32 for further separating oil from the oil-laden gases during contact of the oil-laden gases with the lower walls 90, and to limit the velocity of the oil-laden gases moving adjacent to the base 24. Each of the lower walls 90 extend between the sidewalls 28 and are spaced from the top 26. Furthermore, a plurality of arches 92 are disposed in the exit segment 32 near the outlet 38 for further separating oil from the oil-laden gases during contact of the oil-laden gases with the arches 92 and to limit the velocity of the oil-laden gases moving adjacent to the top 26. Thus, the lower walls 90 and arches 92 each provide for a "dead area" in their respective segments 30, 32 of the chamber 30, 32 that promotes settling of the oil-laden gases to allow separated oil to drain through the oil outlets 44.

In accordance with another aspect of the disclosure, with specific reference to the FIGS. 11-12, and 14-17, an exemplary embodiment of another oil separator 220 is generally shown, wherein the same reference numerals as used above, offset by a factor of 200, are used to identify like features. The exemplary embodiment of the oil separator 220 is described in operable connection with an internal combustion engine of a vehicle, and is shown in a non-limiting embodiment as be disposed in a cam cover assembly 200 however, it should be appreciated that the oil separator 220 could also be incorporated within other vehicle engine components, such as a crank case, as discussed above, or within other systems, e.g., a refrigeration system. With specific reference to FIGS. 11 and 12, the oil separator 220 is disposed between an oil separator cover, also referred to as housing 222 that has a base 224, a top 226 and sidewalls 228. The sidewalls 228 define an inlet 236, that extends into a chamber for receiving oil-laden gases, and an oil outlet 244, that allows oil to flow freely therethrough under the force of gravity from the chamber back to an oil sump of the internal combustion engine, whereas the remaining gases are free to be expelled through a cam cover 202 of the assembly 220, such as via a standard gas recirculation valve (not shown, but known in the art).

At least one or a plurality of baffles 240 can be disposed in the chamber bounded by the housing 222 and cam cover 202, such as adjacent the inlet 236. The baffles 240 can extend between the base 224 and the top 226, such as from the base 224, sidewalls 228 and/or top 226, to define a labyrinth passage for guiding the oil-laden gases after the oil-laden gases have entered the chamber through the inlet 236. In application and operation, the baffles 240 can be configured as discussed above for the baffles 40, and thus, no further discussion is believed necessary.

As best shown in FIGS. 11A, 11B, 12, 14-14B, the oil separator 220 includes a housing 258 having a plurality of generally tapered tube-shaped receptacles, also referred to as frames 246, that extend in laterally spaced, parallel relationship with one another. Each of the frames 246 are configured for receipt of a spiral member, also referred to as auger 266, therein. In the exemplary embodiment, two frames 246 are shown; however, it should be appreciated that more could be included. Each of the frames 246 presents an outer surface 248 and an inner surface 250. The inner surface 250 of each of the frames 246 bounds a channel, also referred to as cavity 252, shown as being frustoconical in shape, that extends between an inlet, also referred to as first opening 254, and an outlet, also referred to as second opening 256. The inner surface 250 is shown in a non-limiting embodiment as having a groove or channel 203 extending from the inlet 254 toward the outlet 256, wherein the channel 203 receives a mating protrusion 267 extending radially outwardly from the respective auger 266 to essentially close off the channel 203 adjacent the inlet 254 against a backflow of oil, wherein the channel 203 functions to drain coalesced oil toward and through the outlet 256, as discussed further below. The inner surface 250 is further shown as having one of a protrusion or recess, shown in a non-limiting embodiment as having a recess in the form of an annular groove 205 extending therein adjacent the inlet 254. The annular grooves 205 facilitate fixation of the augers 266 in the respective cavities 252 of the frames 246. The housing 258 is preferably formed as a monolithic piece of material, such as in a molding operation, by way of example and without limitation, and thus, the plurality of frames 246 are formed as a monolithic piece of material with the housing 258. Of course, it is contemplated that the housing 258 and the frames 246 could be otherwise fixed to one another as separate pieces of material.

The housing 258 is configured to be fixed between the cam cover 202 and the oil separator cover 222, and in one non-limiting embodiment, the housing 258 is configured to be fixed to the oil separator cover 222, such as in a gluing or welding operation, by way of example and without limitation, whereupon the integral subassembly of the oil separator cover 222 and the oil separator 220 can then be assembled to the cam cover 202. To facilitate fixation of the housing 258 to the oil separator cover 222, the housing 258 can be provided having a generally U-shaped channel 204 sized for close or snug receipt of a flange 206 of the oil separator cover 222 therein. To further facilitate fixation of the oil separator cover 222 to the housing 258, a rib 208 of material, shown as being a rib of oil separator cover material within the channel 204 can be provided, wherein the rib 208 of material can be subsequently melted in a welding operation to permanently fix the oil separator cover 222 to the housing 258. Of course, it is to be recognized that the channel 204 and rib 208 could be reversed to be on opposite parts, or that they could configured differently than shown.

The augers 266 each have a helical flight 270 extending about a longitudinal central axis 207 between a proximal end, also referred to as an inlet end 209, and a distal end, also referred to as an outlet end 211. Each of the augers 266 is disposed in a separate one of the cavities 252 to form helical flow paths about the associated central longitudinal axis 207. As shown in a non-limiting embodiment of FIG. 11A, the augers 266 can each be formed having the same configuration as one another, including the flights 270 having the same helical pitch and otherwise, or, as shown in another non-limiting embodiment of FIG. 11B, at least some of the augers 266, 266' can be formed having a different configuration from one another, wherein the flights 270, 270' of the respective augers 266, 266' can have a different helical pitch from one another, with other differences also being possible, with at least some shown and discussed hereafter.

In accordance with one non-limiting embodiment, the augers 266, as shown in FIG. 11A, include one auger 266 having its inlet end 209 left uncovered and open, thereby being freely and continuously exposed and open to flow of oil-laden gas therethrough during all vehicle operating conditions, and one auger 266 having an end wall or cover, also referred to as end cap 212 thereon. Accordingly, if oil-laden gas is present and flowing toward the inlet ends 209, the oil-laden gas is unobstructed and free to flow into the cavity 252 and around the uncovered auger 266. On the other hand, the auger 266 having the end cap 212 is predisposed to preventing the flow of the oil-laden gas into the cavity 252 and around the auger 266 under relatively low flow rate, low pressure conditions, such as when the vehicle is idling or otherwise operating in a low demand condition. Then, upon the flow rate and pressure increasing relative to the low flow rate, low pressure conditions, such as during vehicle acceleration, for example, as will be understood by one skilled in the art, an inlet 213 in the end cap 212 is automatically opened to the flow of oil-laden gas therethrough, such that the oil-laden gas can flow through the inlet 213 and about the additional auger 266 to further facilitate the efficient separation of oil mist from the gases.

The end cap 212 is shown as being fixed to the inlet end 209 of the auger 266, wherein the inlet end 209 is presented at a free end of an annular wall 214 which extends from the inlet end 209 about the longitudinal central axis 207 toward the helical flight 270 to bound an inlet chamber 215 of the auger 266. The end cap 212 has an annular outer periphery 216 extending between an upper wall 217 and a lower wall 218, with a plurality of webs 219 extending between the upper and lower walls 217, 218. A through opening 221 extends along the longitudinal central axis 207 through the upper and lower walls 217, 219 and the inlet 213 extends into the outer periphery 216 between the webs 219 and through the lower wall 218. As such, the through opening 221 and the inlet 213 merge with one another through the lower wall 218.

To facilitate modular assembly, as mentioned above, the augers 266, 266' have one of a protrusion or a recess, shown in a non-limiting embodiment as a protrusion 223 configured for snapping receipt in the corresponding recess 205 in the inner surface 250 of the frames 246. The protrusion 223 is shown as an annular rib 223 configured for snapping receipt in the annular groove 205. Accordingly, the augers 266, 266' are interchangeable with one another during assembly, and thus, the oil separator 220 can be configured as desired, having augers 266 with helical flights 270 having the same pitch, or having augers 266, 266' with different helical pitches. The augers 266 having a larger helical pitch reduce the pressure drop between the inlet end 209 and outlet end 211 and provide an increased velocity of the gases through the cavity 252, while the augers 266' having a smaller helical pitch increase the centripetal force of the oil-laden gases, thereby facilitating separation of the oil droplets for the oil-laden gases at reduced flow rate operating conditions. Accordingly, a predetermined matching of the augers 266, 266' results in an optimal, efficient operation of the oil separator 220.

The oil separator 220 includes a plunger valve 227 having a valve head 229 disposed in the inlet chamber 215. The valve head 229 is configured to move automatically into and out of sealed relation with a valve seat 213' at the inlet 213 in response to varying operating conditions. As discussed above, under relatively low flow rate, low pressure conditions, the valve head 229 remains in a sealed relation with the valve seat 213' at the inlet 213, and then, upon the flow rate and pressure increasing relative to the low flow rate, low pressure conditions, such as during vehicle acceleration, the valve head 229 moves out from sealed engagement with the valve seat 213' at the inlet 213, and if the flow rate of the oil-laden gas is sufficient to fully open the plunger valve 227, the valve head 229 moves into engagement with a valve head stop surface 232, shown as a protrusion or rib projecting radially inwardly from the annular wall 214 of the auger 266 such that the stop surface 232 confronts the valve head 229 to limit the movement of the valve head 229 within the inlet chamber 215 away from the end cap 212 to provide a maximum flow through configuration.

The plunger valve 227 has a valve stem 231 extending from the valve head 229 along the longitudinal central axis 207 through the through opening 221 in the upper wall 217. The valve stem 231 includes at least a portion, and is shown in its entirety as having a non-circular outer peripheral surface 233, as viewed in cross-section taken transversely to the longitudinal central axis 207. With the through opening 221 in the upper wall 217 having a peripheral surface conforming at least in part, and shown in its entirety, with the non-circular outer peripheral surface 233 of the valve stem 231, lateral play of the valve stem 231 within the through opening 221 in the upper wall 217 is inhibited. The lateral cross-sectional shape of the outer peripheral surface 233 is generally cross or X-shaped with a corresponding shape being provided by the periphery of the through opening 221. On the other hand, the periphery of the through opening 221 corresponding with the inlet 213 in the lower wall 218 is enlarged relative to the outer peripheral surface 233 of the valve stem 231 to allow the free flow of gases through the inlet 213 upon the valve head 229 being biased to the open position.

The oil separator 220 includes a spring member 235 configured to bias the valve head 229 into the closed position in sealed abutment with the end cap 212 to perfect a seal over the inlet 213 to inhibit the flow of oil-laden gases therethrough. The valve head 229 is moveable within the chamber 215 against the bias of the spring member 235 to an open position spaced axially away from the lower wall 218 of the end cap 212 in response to pressure being applied against the valve head 229 sufficient to overcome the bias of the spring member 235. In accordance with one non-limiting the embodiment, the spring member 235 can be provided as a coil spring disposed about the valve stem 231. To impart the bias on the plunger valve 227 to bias the valve head 229 upwardly into sealed abutment with the lower wall 218, the spring member 235 is captured between the upper wall 217 of the end cap 212 and a retaining feature, shown as a retaining member 237 that is fixed to the valve stem 231, such as via a heat-staked portion of the valve stem 231, by way of example and without limitation. The retaining member 237 can be provided as a washer or the like, disposed on an end of the valve stem 231, whereupon the end of the valve stem 231 can be heat-staked or other deformed to fix the retaining member 237 in the desired compressed position against a bias of the spring member 235. As such, the compressive bias applied by the spring member 235 against the upper wall 217 and the retaining member 237 forces the valve head 229 into sealed relation about the inlet 213. It will be appreciated and understood by one skilled in the art that the spring force of the spring member 235 can be selected as desired to allow the force required to move the valve head 229 out of sealed engagement about the inlet 213 to be precisely regulated.

A fine mist separator assembly 284 is disposed downstream of the outlet second openings 256 for further separating oil from the oil-laden gases after the oil-laden gases have passed through the frames 246, as discussed above. The fine mist separator assembly 284 includes a generally rectangular-shaped fibrous pad 286 that is porous and disposed adjacent to and in alignment with the second openings 256 of the frames 246 for further absorbing oil in the oil-laden gases to further separate oil from the oil-laden gases. In the exemplary embodiment, the fibrous pad 286 can be made of a nonwoven nylon felt material, however, it should be appreciated that other materials could be utilized without departing from the scope of the subject disclosure, wherein the pad can be adhered, welded or otherwise fixed to the cover 202, by way of example and without limitation.

The fine mist separator assembly 84 also includes a generally rectangular-shaped impactor wall 287 that is disposed adjacent to the fibrous pad 286. The impactor wall 287 is shown as being formed as an integral, monolithic piece with the cover 202, though it could be formed separately and attached thereto, if desired. The impactor wall 287 has a plurality of indentations 289 that further separate the oil from the oil-laden gases during contact of the oil-laden gases with the impactor wall 287, and channel the separated oil toward the oil outlet 244. Meanwhile, "clean," substantially oil-free gases pass over the impactor wall 287 toward a gas outlet. It should be appreciated that the fine mist separator assembly 284 could be configured otherwise, such as without the fibrous pad 286, as discussed above.

In use, depending on the operating conditions of the vehicle, the valve head 229 will either remain in closed and sealed relation against the valve seat 213' (i.e., under low flow conditions, such as at idle), thereby directing the entirety of the flow of oil-laden gasses through the uncovered auger(s) 266, as discussed above, or the valve head 229 will move out of sealed relation from the valve seat 213' to an open position (i.e., under relatively increased flow conditions, such as during acceleration or other high demand use conditions), thereby distributing the of the flow of oil-laden gasses through both the uncovered auger(s) 266 and the augers 266 including the plunger valve 227. It will be readily appreciated by one skilled in the art that the opening and closing of the plunger valve 227 can be controlled by selecting a spring member 235 having the desired spring constant(s). Accordingly, if a plurality of the plunger valves 227 is provided in the assembly 200, different ones of the plunger valves 227 can be provided having spring members 235 with different spring constants from one another, thereby causing the respective plunger valves 227 to open under different flow rates/pressures from one another, thus, providing optimal flow of the oil-laden gases through the oil separator 220 and maximizing the efficiency in which the oil is separated from the oil-laden gases. Further, as discussed above, the helical pitches of the different augers 266, 266' can be varied from one another as desired for the intended vehicle platform. Of course, as discussed above, at least one of the plurality of augers 266, 266' can be provided not having a valve head 229 disposed therein, thereby being continuously open to the flow of oil-laden gases therethrough.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An oil separator for separating oil from oil-laden gases, comprising:
   a housing having a plurality of cavities, each of said cavities extending between a proximal end and a distal end;
   a plurality of augers, each of said augers having a helical flight extending about a longitudinal central axis between an inlet end and an outlet end, said augers being disposed in separate ones of said cavities to form helical flow paths about said longitudinal central axes;
   at least one of said augers has an annular wall extending from said inlet end about said longitudinal central axis, said annular wall bounding an inlet chamber;
   an end cap fixed to said annular wall over said inlet chamber, said end cap having an inlet;
   a plunger valve having a valve head disposed in said inlet chamber; and
   a spring member configured to bias said valve head into a closed position in sealed abutment with said end cap to perfect a seal over said inlet to inhibit the flow of oil-laden gases therethrough, said valve head being moveable within said inlet chamber against the bias of said spring member to an open position away from said end cap in response to pressure being applied against said valve head sufficient to overcome the bias of said spring member; wherein said end cap has a through opening extending along said longitudinal central axis and said plunger valve has a valve stem extending from said valve head through said through opening.

2. The oil separator of claim 1, further including a protrusion extending radially inwardly from said annular wall, said protrusion forming a stop surface configured to confront said valve head to limit the movement of said valve head within said inlet chamber away from said end cap.

3. The oil separator of claim 1, wherein each of said cavities is configured the same for interchangeable receipt of any one of said plurality of augers.

4. The oil separator of claim 1, wherein at least some of said helical flights have different helical pitches from one another.

5. The oil separator of claim 4, wherein at least one of said plurality of augers does not have a valve head disposed therein, wherein said at least one auger having a valve head disposed in said inlet chamber has a helical flight with a first helical pitch and said at least one auger not having a plunger head disposed therein has a helical flight with a second helical pitch, said first helical pitch being greater than said second helical pitch.

6. The oil separator of claim 1, wherein said augers have one of a protrusion or a recess and said cavities have the other of a protrusion or a recess, said protrusion and said recess being configured for a snap fit with one another.

7. The oil separator of claim 6, wherein said protrusion is formed as an annular rib and said recess is formed as an annular groove.

8. The oil separator of claim 7, wherein each of said augers have said annular rib and each of said cavities have said annular groove, said annular rib being sized for a snap fit in said annular groove.

9. The oil separator of claim 1, wherein said spring member is disposed about said valve stem.

10. The oil separator of claim 9, wherein said spring member is a coil spring.

11. The oil separator of claim 10, further including a retaining member fixed to said valve stem and capturing said spring member between said end cap and said retaining member.

12. The oil separator of claim 11, wherein said retaining member is fixed to said valve stem via a heat staked portion of said valve stem.

13. The oil separator of claim 1, wherein said end cap has an annular outer periphery extending between upper and lower walls, said through opening extending through said upper and lower walls and said inlet extending into said outer periphery and through said lower wall.

14. The oil separator of claim 13, further including a plurality of webs extending between said upper and lower walls, said inlet extending between said webs.

15. The oil separator of claim 13, wherein said valve stem includes at least a portion having a non-circular outer peripheral surface, as viewed in cross-section taken transversely to said longitudinal central axis, with said through opening in said upper wall having a peripheral surface conforming at least in part with said non-circular outer peripheral surface of said valve stem to inhibit lateral play of said valve stem within said through opening in said upper wall.

16. The oil separator of claim 15, wherein said through opening in said lower wall has an enlarged peripheral surface relative to said valve stem to form the portion of said inlet extending through said lower wall between said valve stem and said enlarged peripheral surface of said through opening.

17. An oil separator for separating oil from oil-laden gases, comprising:
   a housing having at least one cavity;
   an auger disposed in at least one of said at least one cavity, said auger having a helical flight extending about a longitudinal central axis between an inlet end and an outlet end to form a helical flow path about said longitudinal central axis;
   at least one of said auger having an annular wall extending from said inlet end about said longitudinal central axis;
   an end wall fixed to said annular wall to bound an inlet chamber, said end wall having an inlet extending into said inlet chamber;
   a valve head disposed in said inlet chamber; and
   a spring member configured to bias said valve head into a closed position in sealed abutment with said end wall to perfect a seal over said inlet to inhibit the flow of oil-laden gases therethrough, said valve head being moveable within said inlet chamber against the bias of said spring member to an open position in response to pressure being applied against said valve head sufficient to overcome the bias of said spring member; wherein said end wall has a through opening extending along said longitudinal central axis and further including a valve stem extending from said valve head through said through opening, wherein said spring member is disposed about said valve stem.

18. The oil separator of claim 17, wherein said at least one cavity includes a plurality of cavities and said auger includes a plurality of augers, wherein at least one of said plurality of augers does not include said valve head.

\* \* \* \* \*